US012602378B2

(12) United States Patent
Nahamoo et al.

(10) Patent No.: US 12,602,378 B2
(45) Date of Patent: Apr. 14, 2026

(54) DOCUMENT PROCESSING AND RESPONSE GENERATION SYSTEM

(71) Applicant: Pryon Incorporated, Raleigh, NC (US)

(72) Inventors: David Nahamoo, Great Neck, NY (US); Igor Roditis Jablokov, Raleigh, NC (US); Vaibhava Goel, Chappaqua, NY (US); Etienne Marcheret, White Plains, NY (US); Ellen Eide Kislal, Leawood, KS (US); Steven John Rennie, Yorktown Heights, NY (US); Marie Wenzel Meteer, Arlington, MA (US); Soonthorn Ativanichayaphong, New York, NY (US); Joseph Allen Pruitt, Sammamish, WA (US); John Michael Pruitt, Seattle, WA (US); Bryan Dempsey, Raleigh, NC (US); Rangachari Anand, Teaneck, NJ (US); Meghan Hickey, Somerville, MA (US); Ajinkya Jitendra Zadbuke, Cambridge, MA (US); Neil Rohit Mallinar, Astoria, NY (US); Lucas C. Siler, Shoreline, WA (US); Gregory Pelton, Raleigh, NC (US); Chul Sung, Fort Lee, NJ (US); Matthew Brian Cobb, Redmond, WA (US); Carmi Rothberg, New York, NY (US)

(73) Assignee: Pryon Incorporated, Raleigh, NC (US)

( * ) Notice: Subject to any disclaimer, the term of this patent is extended or adjusted under 35 U.S.C. 154(b) by 0 days.

(21) Appl. No.: 18/435,357

(22) Filed: Feb. 7, 2024

(65) Prior Publication Data

US 2024/0248897 A1 Jul. 25, 2024

Related U.S. Application Data

(63) Continuation of application No. 17/358,829, filed on Jun. 25, 2021, now abandoned.

(Continued)

(51) Int. Cl.
 *G06F 16/3329* (2025.01)
 *G06F 16/2452* (2019.01)
 (Continued)

(52) U.S. Cl.
 CPC .... *G06F 16/24522* (2019.01); *G06F 16/3328* (2019.01); *G06F 16/3329* (2019.01);
 (Continued)

(58) Field of Classification Search
 CPC ........ G06N 3/08; G06F 40/30; G06F 16/3329
 See application file for complete search history.

(56) References Cited

U.S. PATENT DOCUMENTS

| | | | |
|---|---|---|---|
| 5,227,874 A | 7/1993 | Von Kohorn | |
| 6,678,118 B2 | 1/2004 | Tanaka et al. | |

(Continued)

FOREIGN PATENT DOCUMENTS

| | | |
|---|---|---|
| CN | 111159416 A | 5/2020 |
| KR | 10-2009-0108530 A | 10/2009 |
| KR | 10-2015-0098719 A | 8/2015 |

OTHER PUBLICATIONS

Zhu, Henghui & Nan, Feng & Wang, Zhiguo & Nallapati, Ramesh & Xiang, Bing. (2019). 8 pages Who did They Respond to? Conversation Structure Modeling using Masked Hierarchical Transformer. https://doi .org/10.48550/arXiv.1911.10666 (Year: 2019).

(Continued)

*Primary Examiner* — Benjamin Smith
(74) *Attorney, Agent, or Firm* — J. Robin Rohlicek

(57) ABSTRACT

Disclosed are methods, systems, devices, apparatus, media, design structures, and other implementations, including a (Continued)

method that includes receiving, at a local device from a remote device, query data representative of a question relating to source content of a source document of a repository of a plurality of source documents, with the source content being associated with transformed content accessible from the local device. The method further includes generating, in response to determination, at the local device, of a match between the query data and at least one portion of the transformed content, output data comprising one or more of a pointer to access, in the source document accessible from the remote device, at least one portion of the source document corresponding to the at least one portion of the transformed content, or a copy of the at least one portion of the source document.

16 Claims, 7 Drawing Sheets

Related U.S. Application Data

(60) Provisional application No. 63/043,906, filed on Jun. 25, 2020.

(51) Int. Cl.

| | |
|---|---|
| *G06F 16/332* | (2025.01) |
| *G06F 16/3349* | (2025.01) |
| *G06F 16/335* | (2019.01) |
| *G06F 16/338* | (2019.01) |
| *G06F 16/9032* | (2019.01) |
| *G06F 16/93* | (2019.01) |
| *G06F 16/957* | (2019.01) |
| *G06F 40/131* | (2020.01) |
| *G06F 40/137* | (2020.01) |
| *G06F 40/151* | (2020.01) |
| *G06F 40/20* | (2020.01) |
| *G06F 40/247* | (2020.01) |
| *G06F 40/284* | (2020.01) |
| *G06F 40/30* | (2020.01) |
| *G06N 3/08* | (2023.01) |
| *G06N 5/022* | (2023.01) |
| *G06N 5/04* | (2023.01) |
| *G06N 3/006* | (2023.01) |
| *G06N 3/044* | (2023.01) |
| *G06N 3/045* | (2023.01) |

(52) U.S. Cl.
CPC ........ *G06F 16/3349* (2019.01); *G06F 16/335* (2019.01); *G06F 16/338* (2019.01); *G06F 16/9032* (2019.01); *G06F 16/93* (2019.01); *G06F 16/9574* (2019.01); *G06F 40/131* (2020.01); *G06F 40/137* (2020.01); *G06F 40/151* (2020.01); *G06F 40/20* (2020.01); *G06F 40/247* (2020.01); *G06F 40/284* (2020.01); *G06F 40/30* (2020.01); *G06N 5/022* (2013.01); *G06N 5/04* (2013.01); *G06N 3/006* (2013.01); *G06N 3/044* (2023.01); *G06N 3/045* (2023.01); *G06N 3/08* (2013.01)

(56) References Cited

U.S. PATENT DOCUMENTS

| | | | | |
|---|---|---|---|---|
| 7,580,835 | B2 * | 8/2009 | Ichimura | G10L 15/26 |
| | | | | 704/235 |
| 7,716,077 | B1 | 5/2010 | Mikurak | |
| 8,380,531 | B2 | 2/2013 | Paty et al. | |
| 8,892,420 | B2 * | 11/2014 | Sun | G06F 40/40 |
| | | | | 704/254 |
| 9,082,035 | B2 * | 7/2015 | Hwang | G06V 30/274 |
| 9,223,779 | B2 * | 12/2015 | Sun | G06F 40/40 |
| 9,330,084 | B1 * | 5/2016 | Kadambi | G06F 40/56 |
| 9,507,852 | B2 | 11/2016 | Petrov et al. | |
| 10,108,702 | B2 * | 10/2018 | Byron | G10L 15/22 |
| 10,169,549 | B2 * | 1/2019 | Zhu | G06N 3/08 |
| 10,276,154 | B2 * | 4/2019 | Waltermann | G10L 15/1815 |
| 10,303,798 | B2 * | 5/2019 | Stubley | G06F 16/3329 |
| 10,402,433 | B2 * | 9/2019 | Liu | G06N 20/20 |
| 10,430,445 | B2 * | 10/2019 | Crouch | G06F 16/313 |
| 10,460,162 | B2 * | 10/2019 | Gelosi | G06F 40/131 |
| 10,484,542 | B1 | 11/2019 | Rager | |
| 10,521,567 | B2 * | 12/2019 | Zhu | G06Q 30/0601 |
| 10,691,735 | B2 | 6/2020 | Byron et al. | |
| 10,726,198 | B2 * | 7/2020 | Gelosi | G06F 40/166 |
| 10,783,159 | B2 * | 9/2020 | Boston | G06F 16/24578 |
| 10,878,197 | B2 * | 12/2020 | Yin | G06F 40/35 |
| 11,017,312 | B2 * | 5/2021 | Byron | G06N 5/041 |
| 11,182,540 | B2 * | 11/2021 | Satterfield | G06F 40/186 |
| 11,250,038 | B2 * | 2/2022 | Bajaj | G06F 16/38 |
| 11,257,144 | B1 * | 2/2022 | Hamel | G06Q 30/0631 |
| 11,281,863 | B2 * | 3/2022 | Keskar | G06N 3/084 |
| 11,392,763 | B2 * | 7/2022 | Begun | G06F 40/106 |
| 11,403,355 | B2 * | 8/2022 | Karandish | G06F 16/3329 |
| 11,475,303 | B2 | 10/2022 | Wagner et al. | |
| 11,501,085 | B2 * | 11/2022 | Galitsky | G06F 40/284 |
| 11,507,740 | B2 * | 11/2022 | Begun | G06F 40/186 |
| 11,556,573 | B2 | 1/2023 | Srinivasan et al. | |
| 11,573,991 | B2 | 2/2023 | Wang et al. | |
| 11,640,505 | B2 * | 5/2023 | Gao | G06F 40/289 |
| | | | | 704/9 |
| 11,687,734 | B2 * | 6/2023 | Harper | G06F 40/295 |
| | | | | 704/9 |
| 11,775,839 | B2 * | 10/2023 | Mass | G06F 16/24578 |
| | | | | 706/20 |
| 11,822,588 | B2 * | 11/2023 | Boxwell | G06F 17/10 |
| 11,921,764 | B2 * | 3/2024 | Prasad Tanniru | G06F 16/35 |
| 2004/0117352 | A1 | 6/2004 | Schabes et al. | |
| 2005/0079477 | A1 | 4/2005 | Diesel et al. | |
| 2005/0143999 | A1 * | 6/2005 | Ichimura | G10L 15/26 |
| | | | | 704/E15.045 |
| 2005/0182791 | A1 | 8/2005 | Lim et al. | |
| 2006/0101037 | A1 | 5/2006 | Brill et al. | |
| 2006/0239546 | A1 | 10/2006 | Tedesco et al. | |
| 2007/0055657 | A1 | 3/2007 | Yano | |
| 2007/0219794 | A1 | 9/2007 | Park et al. | |
| 2007/0219958 | A1 | 9/2007 | Park et al. | |
| 2009/0164456 | A1 * | 6/2009 | Slaney | G06F 16/5866 |
| | | | | 707/999.005 |
| 2011/0145166 | A1 | 6/2011 | Kmak et al. | |
| 2012/0130705 | A1 * | 5/2012 | Sun | G06F 40/40 |
| | | | | 704/9 |
| 2012/0215602 | A1 | 8/2012 | Ramer et al. | |
| 2012/0219935 | A1 | 8/2012 | Stebbings et al. | |
| 2013/0103445 | A1 | 4/2013 | Alonso Lord et al. | |
| 2013/0108115 | A1 * | 5/2013 | Hwang | G06V 30/268 |
| | | | | 382/161 |
| 2013/0132308 | A1 | 5/2013 | Boss et al. | |
| 2014/0222773 | A1 | 8/2014 | Levacher et al. | |
| 2015/0100307 | A1 * | 4/2015 | Sun | G06F 40/284 |
| | | | | 704/9 |
| 2015/0161996 | A1 | 6/2015 | Petrov et al. | |
| 2015/0242802 | A1 | 8/2015 | Banerjee et al. | |
| 2015/0310861 | A1 * | 10/2015 | Waltermann | G10L 15/1815 |
| | | | | 704/275 |
| 2016/0078102 | A1 * | 3/2016 | Crouch | G06F 16/313 |
| | | | | 707/722 |
| 2016/0098444 | A1 | 4/2016 | Berajawala et al. | |
| 2016/0098737 | A1 * | 4/2016 | Berajawala | G06F 16/24578 |
| | | | | 705/7.32 |
| 2016/0132492 | A1 * | 5/2016 | Sun | G06F 40/53 |
| | | | | 704/9 |
| 2016/0179934 | A1 * | 6/2016 | Stubley | G06F 16/243 |
| | | | | 707/722 |
| 2016/0180217 | A1 * | 6/2016 | Boston | G06F 16/248 |
| | | | | 706/46 |

(56) References Cited

U.S. PATENT DOCUMENTS

| | | | |
|---|---|---|---|
| 2016/0180242 A1* | 6/2016 | Byron | G06N 5/041 |
| | | | 706/11 |
| 2016/0196490 A1 | 7/2016 | Chandrasekaran et al. | |
| 2016/0267383 A1 | 9/2016 | Bastide et al. | |
| 2016/0300252 A1 | 10/2016 | Frank et al. | |
| 2017/0060994 A1* | 3/2017 | Byron | G10L 15/22 |
| 2017/0213139 A1 | 7/2017 | Sawant et al. | |
| 2017/0322939 A1 | 11/2017 | Byron et al. | |
| 2018/0285535 A1* | 10/2018 | Zhu | G06N 20/00 |
| 2018/0373782 A1* | 12/2018 | Liu | G06F 16/90335 |
| 2019/0005123 A1 | 1/2019 | Byron et al. | |
| 2019/0087549 A1* | 3/2019 | Zhu | G06N 3/08 |
| 2019/0114479 A1* | 4/2019 | Gelosi | G06F 40/166 |
| 2019/0220487 A1 | 7/2019 | Denninghoff | |
| 2019/0220503 A1* | 7/2019 | Gelosi | G06F 40/177 |
| 2019/0228099 A1* | 7/2019 | Bajaj | G06N 3/044 |
| 2019/0392066 A1 | 12/2019 | Kim et al. | |
| 2020/0004813 A1 | 1/2020 | Galitsky | |
| 2020/0134088 A1* | 4/2020 | Boxwell | G06F 16/3344 |
| 2020/0167420 A1* | 5/2020 | Yin | G06F 40/30 |
| 2020/0175046 A1 | 6/2020 | Wang et al. | |
| 2020/0279105 A1 | 9/2020 | Muffat et al. | |
| 2020/0286463 A1 | 9/2020 | Galitsky | |
| 2020/0334334 A1* | 10/2020 | Keskar | G06N 3/084 |
| 2020/0342164 A1* | 10/2020 | Satterfield | G06F 40/216 |
| 2020/0356603 A1* | 11/2020 | Bao | G06F 16/907 |
| 2020/0372341 A1 | 11/2020 | Asai et al. | |
| 2021/0004540 A1* | 1/2021 | Harper | G06F 40/30 |
| 2021/0056150 A1* | 2/2021 | Karandish | G06F 16/3329 |
| 2021/0056445 A1* | 2/2021 | Wu | G06F 40/295 |
| 2021/0064821 A1* | 3/2021 | Seth | G06F 40/284 |
| 2021/0081608 A1* | 3/2021 | Begun | G06V 30/414 |
| 2021/0081613 A1* | 3/2021 | Begun | G06F 40/289 |
| 2021/0082424 A1* | 3/2021 | Johnson | G06F 18/214 |
| 2021/0090694 A1 | 3/2021 | Colley et al. | |
| 2021/0103775 A1* | 4/2021 | Glass | G06F 40/284 |
| 2021/0110163 A1* | 4/2021 | Culbertson | G06V 10/762 |
| 2021/0150152 A1* | 5/2021 | Galitsky | G06F 40/56 |
| 2021/0174016 A1* | 6/2021 | Fox | G06N 3/045 |
| 2021/0174023 A1* | 6/2021 | Gao | G06F 40/35 |
| 2021/0174923 A1 | 6/2021 | Huang et al. | |
| 2021/0182996 A1 | 6/2021 | Cella et al. | |
| 2021/0191925 A1 | 6/2021 | Sianez | |
| 2021/0209139 A1* | 7/2021 | Wu | G06N 3/006 |
| 2021/0216576 A1* | 7/2021 | Staub | G06Q 30/0282 |
| 2021/0216577 A1* | 7/2021 | Xiao | G06F 16/3329 |
| 2021/0240775 A1* | 8/2021 | Liu | G06F 16/9035 |
| 2021/0264208 A1* | 8/2021 | Damodaran | G06N 5/02 |
| 2021/0279622 A1* | 9/2021 | Bui | G06N 20/00 |
| 2021/0286832 A1* | 9/2021 | Prasad Tanniru | G06N 5/02 |
| 2021/0319309 A1 | 10/2021 | Wagner et al. | |
| 2021/0319335 A1* | 10/2021 | Jiang | G06N 5/02 |
| 2021/0342684 A1* | 11/2021 | Shraga | G06N 3/045 |
| 2021/0349429 A1 | 11/2021 | Grehant | |
| 2021/0350795 A1* | 11/2021 | Kenter | G10L 15/02 |
| 2021/0357752 A1 | 11/2021 | Chen et al. | |
| 2021/0365500 A1* | 11/2021 | Gunaselara | G06F 40/284 |
| 2021/0374168 A1* | 12/2021 | Srinivasan | G06V 10/82 |
| 2021/0374524 A1 | 12/2021 | Feng et al. | |
| 2021/0374547 A1* | 12/2021 | Wang | G06N 3/047 |
| 2021/0375280 A1* | 12/2021 | Wang | G10L 15/063 |
| 2021/0383068 A1* | 12/2021 | Mattivi | G06F 16/9024 |
| 2021/0383127 A1* | 12/2021 | Kikin-Gil | G06V 10/811 |
| 2021/0390127 A1* | 12/2021 | Fox | G06F 16/335 |
| 2021/0390257 A1 | 12/2021 | Pang et al. | |
| 2021/0390418 A1* | 12/2021 | Mass | G06N 3/08 |
| 2021/0390609 A1 | 12/2021 | Trinh | |
| 2022/0027413 A1* | 1/2022 | Quint | G06F 16/9535 |
| 2022/0108086 A1* | 4/2022 | Wu | G06F 40/35 |
| 2022/0147718 A1* | 5/2022 | Kim | G06N 5/04 |
| 2022/0171943 A1* | 6/2022 | Keskar | G06N 3/084 |

OTHER PUBLICATIONS

Cloudera Fast Forward Labs, "Building a QA System with BERT on Wikipedia", May 19, 2020, 32 pages, https://qa.fastforwardlabs.com/pytorch/hugging%20face/wikipedia/bert/transformers/2020/05/19/Getting_Started_with_QA.html (Year: 2020).

Ankit Chadha, Rewa Sood; "BERTQA—Attention on Steroids"; Dec. 14, 2019, 9 pages, https://doi.org/10.48550/arXiv.1912.10435 (Year: 2019).

* cited by examiner

200

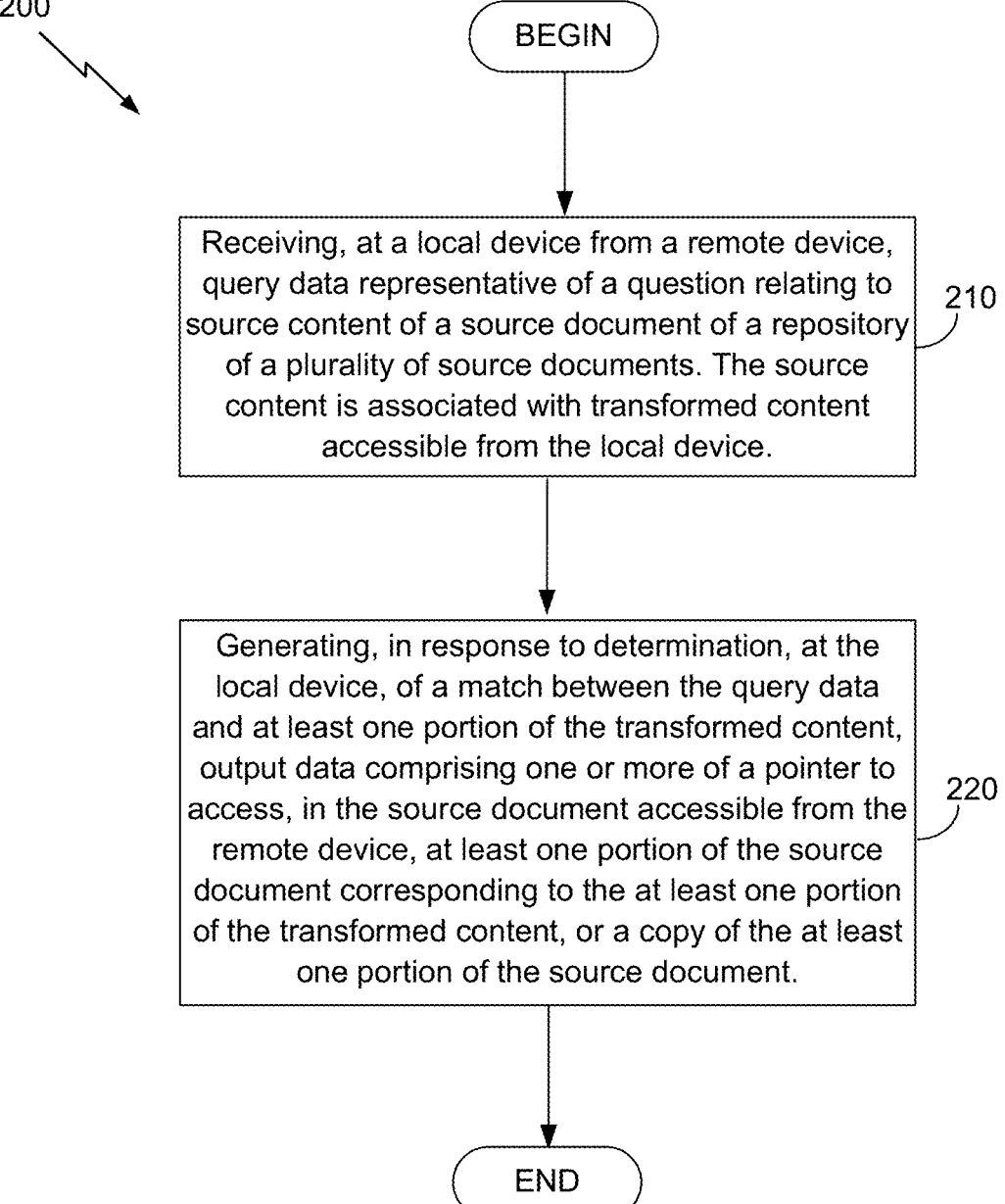

BEGIN

Receiving, at a local device from a remote device, query data representative of a question relating to source content of a source document of a repository of a plurality of source documents. The source content is associated with transformed content accessible from the local device.

210

Generating, in response to determination, at the local device, of a match between the query data and at least one portion of the transformed content, output data comprising one or more of a pointer to access, in the source document accessible from the remote device, at least one portion of the source document corresponding to the at least one portion of the transformed content, or a copy of the at least one portion of the source document.

220

END

BEGIN

Receiving a source document.    410

Applying one or more pre-processes to the source document to produce contextual information representative of the structure and content of the source document.    420

Transforming the source document, based on the contextual information, to generate a question-and-answer searchable document.    430

END

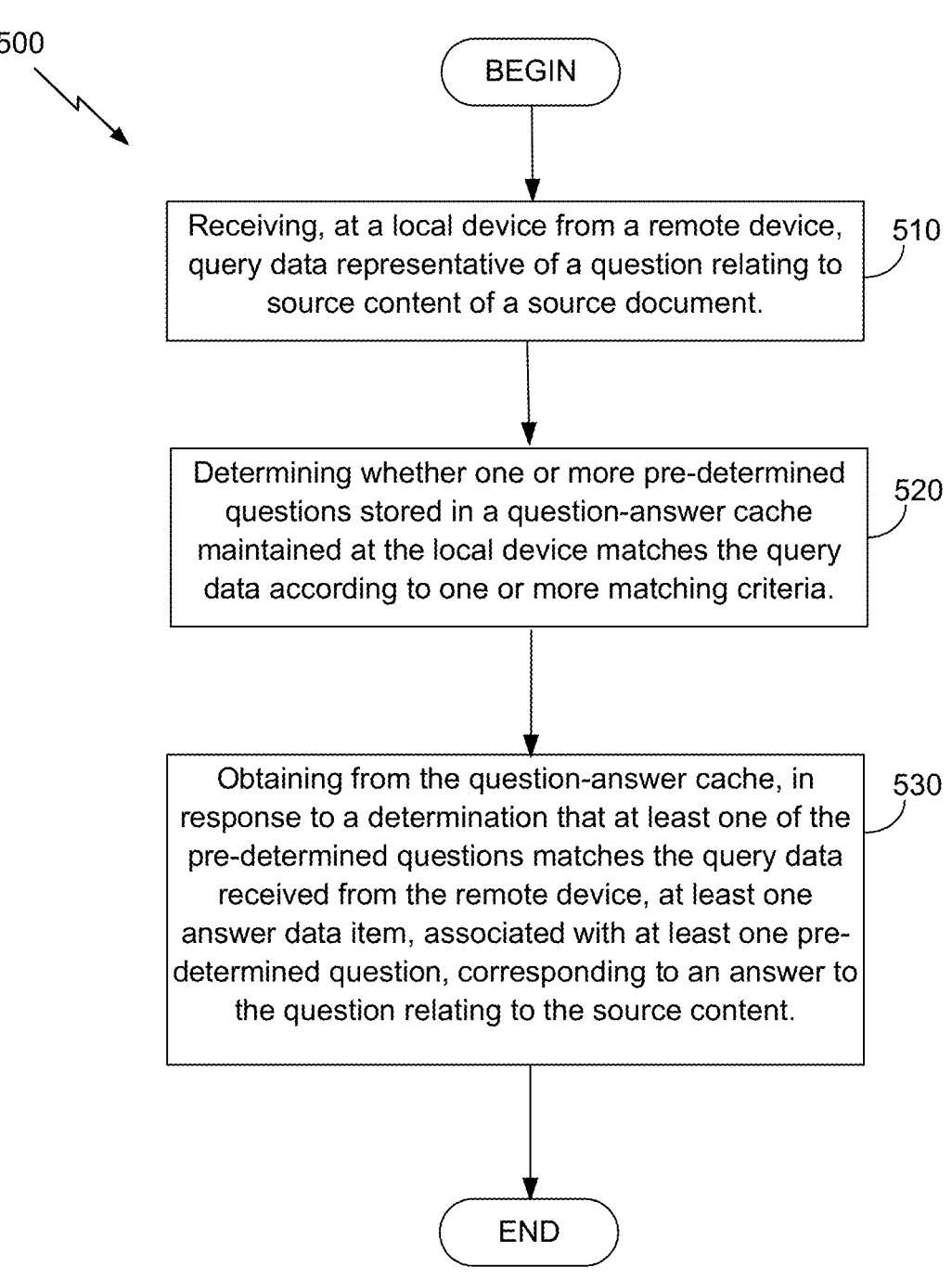

500

BEGIN

Receiving, at a local device from a remote device, query data representative of a question relating to source content of a source document.　510

Determining whether one or more pre-determined questions stored in a question-answer cache maintained at the local device matches the query data according to one or more matching criteria.　520

Obtaining from the question-answer cache, in response to a determination that at least one of the pre-determined questions matches the query data received from the remote device, at least one answer data item, associated with at least one pre-determined question, corresponding to an answer to the question relating to the source content.　530

END

*FIG. 5*

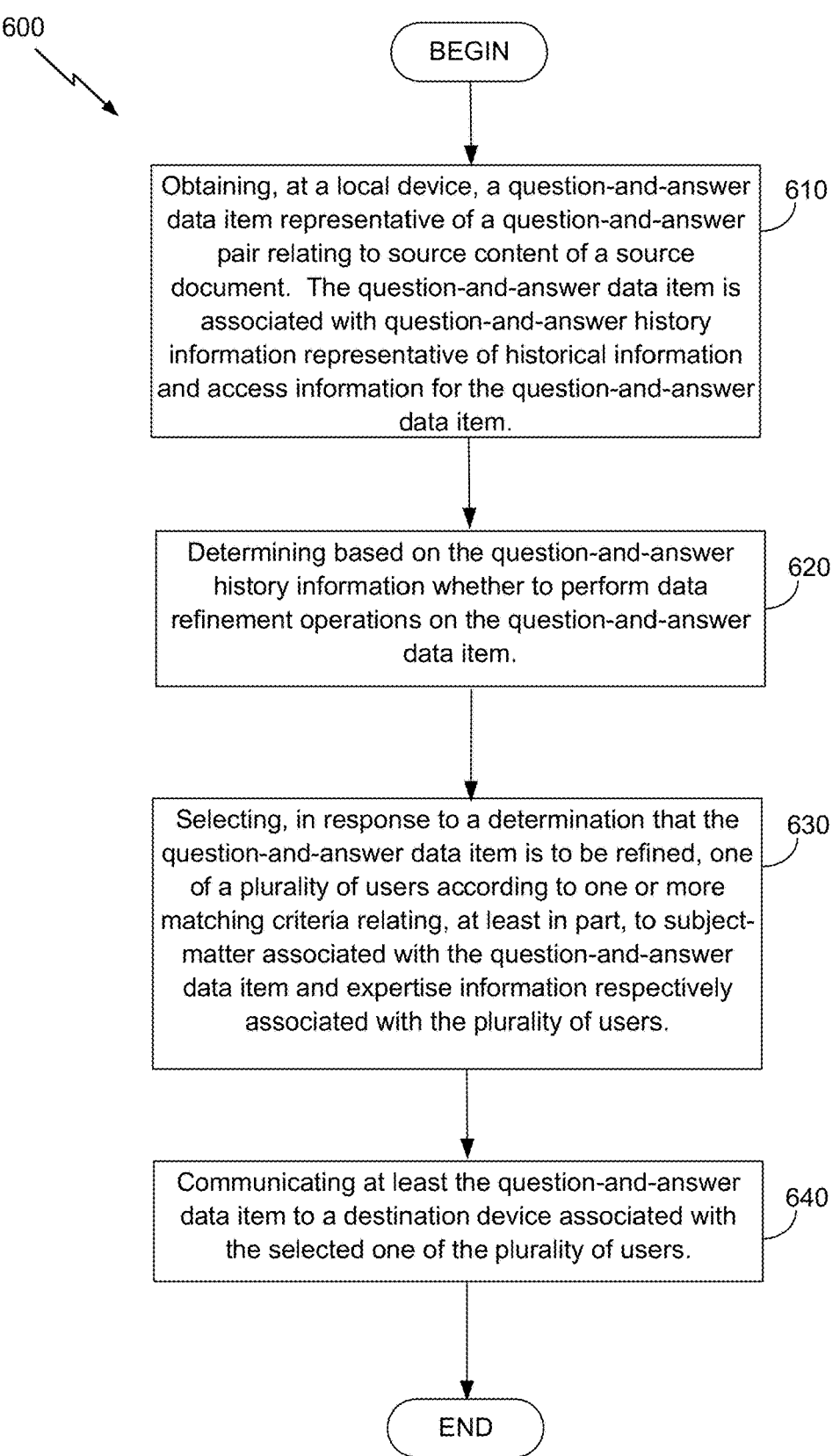

600

BEGIN

Obtaining, at a local device, a question-and-answer data item representative of a question-and-answer pair relating to source content of a source document. The question-and-answer data item is associated with question-and-answer history information representative of historical information and access information for the question-and-answer data item.    610

Determining based on the question-and-answer history information whether to perform data refinement operations on the question-and-answer data item.    620

Selecting, in response to a determination that the question-and-answer data item is to be refined, one of a plurality of users according to one or more matching criteria relating, at least in part, to subject-matter associated with the question-and-answer data item and expertise information respectively associated with the plurality of users.    630

Communicating at least the question-and-answer data item to a destination device associated with the selected one of the plurality of users.    640

END

*FIG. 6*

DOCUMENT PROCESSING AND RESPONSE GENERATION SYSTEM

CROSS-REFERENCE TO RELATED APPLICATIONS

This application is a continuation of U.S. application Ser. No. 17/358,829, filed Jun. 25, 2021, which claims priority to, and the benefit of, U.S. Provisional Application No. 63/043,906, entitled "Document Processing and Response Generation System" and filed Jun. 25, 2020, the contents of all of which are incorporated herein by reference in their entireties.

BACKGROUND

This invention relates to a document processing and response generation system, and in particular to an approach to facilitate quick and efficient determination of answers from a potentially large repository of documents in response to user queries, which may be provided as natural language questions.

Organizations often collect large number of documents to service as a repository of information, be it administrative or technical information. For example, a corporation may have a large library of human resource documents, which together define, in a hopefully consistent manner, the HR policies and procedures of the corporation. A user, such as a corporate employee, may have to search the collection of documents to answer a question, such as "how much vacation time am I entitled to?"

A common problem with file-centric processing where unstructured and structured data exist in the file is that a rich natural language interface does not exist for users to navigate the document according to their needs and desires. As such, for example, many documents have long pages of explanation that are in small font that, if needed, force the user to read the entire explanation to find the key information the user needs.

Another problem that may occur in situations involving a large library of documents is that the organization may not have the resources to arrange and manage their documents into easily searchable documents (i.e., for question-answer querying), and may need to rely on a third-party's services to do so. In yet another situation, organizations that have the resources to maintain and manage their documents in searchable forms, may have multiple distributed computing networks (at different locales), and may decide (for efficiency and cost reasons) to store searchable documents at a single centralized location instead of individually storing the same set of searchable documents at each of their separate local networks. In such situations, data security and privacy issues become a concern, especially if sensitive information needs to be communicated across communication media accessible to people outside the organizations storing their documents at a central, or 3rd-party, searchable document repository.

SUMMARY

The present disclosure is directed to a document processing and response generation system configured to determine an answer, from a library of documents and various other data management applications, accessible by the document processing system, in response to a query provided by a user. In some embodiments, the system returns, to the user that submitted the query, output that includes a pointer to a part of a document (e.g., a phrase or an excerpt) in the library of documents (or in stored records of the data management applications), that is separately accessible by the user, so that the user can retrieve the document (and/or specific portions of the document) pointed to by the pointer. The actual user-readable answer and/or a summary of the answer may additionally or alternatively be provided to the user. The document library can be a remote secure data repository that the document processing system is credentialed to access, or can be a local repository. Document processing may be based on one or more transformations of source content into transformed content that is arranged in a document object model (DOM) item. Q-A searching can then be applied to the transformed content. Search accuracy and speed can be improved through use of a question-answer cache.

Thus, in some variations, a method is provided that includes receiving, at a local device from a remote device, query data representative of a question relating to source content of a source document of a repository of a plurality of source documents, with the source content being associated with transformed content accessible from the local device. The method further includes generating output data, in response to determination, at the local device, of a match between the query data and at least one portion of the transformed content, with the output data including one or more of a pointer to access, in the source document accessible from the remote device, at least one portion of the source document corresponding to the at least one portion of the transformed content, or a copy of the at least one portion of the source document.

Embodiments of the method may include at least some of the features described in the present disclosure, including one or more of the following features.

The pointer to access the at least one portion of the source document may include one or more of, for example, document identifier identifying the source document in the repository of a plurality of source documents, network address of the source document in the repository of a plurality of source documents, starting and end locations of the at least one portion of the source document within the source document, and/or a word span.

The at least one portion of the transformed content may be stored in a repository of document object model (DOM) data items, with a DOM data item corresponding to the at least one portion of the transformed content including the pointer to access the at least one portion of the source document, and one or more of, for example, at least one transformed element representative of the at least one portion of the source content, the at least one portion of the source content, and/or contextual information associated with the at least one portion of the source content.

The contextual information associated with the at least one portion of the source document may include feedback data from one or more users indicating responsiveness level of the output data to the question relating to the source content of the source document.

The method may further include receiving a copy of the source document at the local device, segmenting the copy of the source document into a plurality of document segments, and transforming each of the plurality of document segments into one or more respective transformed segments according to one or more transformations.

The method may further include receiving from an administrator information identifying location of the source document in the repository of the plurality of source documents.

The one or more transformations may include one or more of, for example, a coarse linearization transform to generate coarse numerical vectors representative of coarse content of the plurality of document segments, and/or a fine-detail transformation to generate fine-detail transformed content records representative of the content of the plurality of document segments.

One or more of the coarse transformation or the fine-detail transformation may include a transformation, applied to one or more document segments, based on Bidirectional Encoder Representations from Transformers (BERT) processing.

The method may further include transforming the query data into transformed query data compatible with the transformed source content.

The method may further include identifying one or more candidate portions in the transformed source content with respective coarse numerical vectors matching, according to a first criterion, the transformed query data.

The method may further include determining, from one or more fine-detail transformed content records corresponding to the one or more candidate portions identified based on their respective numerical vectors, at least one fine-detail transformed content record matching, according to a second criterion, a fine-detail transformed data of the query data.

The method may further include identifying one or more candidate portions in the transformed source content with respective fine-detail transformed content records matching, according to a second criterion, the transformed query data.

Transforming the each of the plurality of the document segments may include transforming the each of the plurality of the document segments using a trained neural network implementing the one or more transformations.

Segmenting the source content into the plurality of document segments may include segmenting the source content into the plurality of document segments according to one or more pre-processing rules.

Segmenting the source content may include segmenting the source content into the plurality of document segments according to hierarchical rules semantically associating one portion of the source content with one or more other portions of the source content.

The method may further include retrieving augmented data associated with the received source document, and segmenting a combination of the source document and the augmented data into the plurality of document segments.

Retrieving the augmented data may include one or more of, for example, retrieving the augmented data based on links included in the source document, and/or performing co-reference resolution to determine one or more names or expressions identified in the source document, and searching information repositories accessible from the local device to retrieve additional information associated with the determined one or more names or expressions identified in the source document.

The generated output data may further include a summary of the source content corresponding to the at least one portion of the transformed content.

The method may further include transmitting the output data to the remote device.

The method may further include identifying based on the received query data representative of the question one or more additional questions, from a repository of query data representative of a plurality of questions associated with source documents, to apply to the transformed content.

The method may further include determining whether the received query data matches one of pre-determined questions, and in response to determining that the received query data matches one of the pre-determined questions, generating the output data based on one or more answer data records associated with the matched one of the pre-determined questions.

The method may further include partitioning the source content into one or more content portions, and transforming the one or more content portions according to a fine-detail transformation to generate fine-detail transformed content records representative of contents of the one or more content portions.

The fine-detail transformation may include a transformation, applied to one or more document segments, based on Bidirectional Encoder Representations from Transformers (BERT) processing.

Transforming the at least one of the one or more content portions may include transforming the at least one of the one or more content portions into transformed content based on one or more ground truth samples of question-and-answer pairs.

The method may further include deriving a summary of the source document based on the transformed one or more content portions according to the fine-detail transformation, wherein deriving the summary includes identifying at least one of the transformed one or more content portions with a level of similarity to a pre-determined summary portion that exceeds a similarity threshold.

The local device may be located at one of, for example, a first network operated by a first party with the first network being different from a second network on which the remote device is located with the second network being operated by a second party, or a third network on which both the local device and the remote device are located.

The method may further include segmenting, at the remote device (e.g., a customer network node), the copy of the source document into a plurality of document segments, transforming, at the remote device, each of the plurality of document segments into one or more respective transformed segments according to one or more transformations, and communicating the one or more respective transformed segments to the local device for storage at the local device.

In some variations, a system is provided that includes one or more communication interfaces configured to receive, from a remote device, query data representative of a question relating to source content of a source document of a repository of a plurality of source documents, with the source content being associated with transformed content accessible from the system. The system may further include a query engine configured to generate, in response to determination of a match between the query data and at least one portion of the transformed content, output data comprising at least a pointer to access, in the source document accessible from the remote device, at least one portion of the source document corresponding to the at least one portion of the transformed content.

Embodiments of the system may include at least some of the features described in the present disclosure, including at least some of the features described above in relation to the method, as well as one or more of the following features.

The system may further include an ingestion engine configured to segment a copy of the source document, received via the one or more interfaces, into a plurality of document segments, and transform each of the plurality of document segments into one or more respective transformed segments according to one or more transformations.

The one or more transformations may include one or more of, for example, a coarse linearization transform to generate coarse numerical vectors representative of coarse content of the plurality of document segments, and/or a fine-detail transformation to generate fine-detail transformed content records representative of the content of the plurality of document segments.

The system may further include a query processing module configured to transform the query data into transformed query data compatible with the transformed source content, identify one or more candidate portions in the transformed source content with respective coarse numerical vectors matching, according to a first criterion, the transformed query data, and determine, from one or more fine-detail transformed content records corresponding to the one or more candidate portions identified based on their respective coarse numerical vectors, at least one fine-detail transformed content record matching, according to a second criterion, a fine-detail transformed data of the query data.

The ingestion engine configured to segment the source content may be configured to segment the source content into the plurality of document segments according to one or more pre-processing rules, the one or more pre-processing rules including one or more hierarchical rules semantically associating one portion of the source content with one or more other portions of the source content.

The ingestion engine may be further configured to retrieve augmented data associated with the received source document, and segment a combination of the source document and the augmented data into the plurality of document segments.

The query engine may be further configured to identify based on the received query data representative of the question one or more additional questions, from a repository of query data representative of a plurality of questions associated with source documents, to apply to the transformed content.

The query engine may be further configured to determine whether the received query data matches one of pre-determined questions, and to generate, in response to determining that the received query data matches one of the pre-determined questions, the output data based on one or more answer data records associated with the matched one of the pre-determined questions.

The system may further include the remote device. The system may be located at one of, for example, a first network operated by a first party with the first network being different from a second network on which the remote device is located with the second network being operated by a second party, or a third network on which both the local device and the remote device are located.

In some variations, a non-transitory computer readable media is provided, that is programmed with instructions, executable on one or more processors of a computing system, to receive, at a local device from a remote device, query data representative of a question relating to source content of a source document of a repository of a plurality of source documents, with the source content being associated with transformed content accessible from the local device, and generate output data, in response to determination, at the local device, of a match between the query data and at least one portion of the transformed content, comprising at least a pointer to access, in the source document accessible from the remote device, at least one portion of the source document corresponding to the at least one portion of the transformed content.

Embodiments of the computer readable media may include at least some of the features described in the present disclosure, including at least some of the features described above in relation to the method and to the system.

Other features and advantages of the invention are apparent from the following description, and from the claims.

BRIEF DESCRIPTION OF THE DRAWINGS

These and other aspects will now be described in detail with reference to the following drawings.

FIG. 2 is a flowchart of an example procedure for Question-and-Answer document processing and response generation system.

FIG. 5 is a flowchart of an example procedure for content management and question answering using an input cache.

FIG. 6 is a flowchart of an example procedure for data curation.

DESCRIPTION

Figure 1:
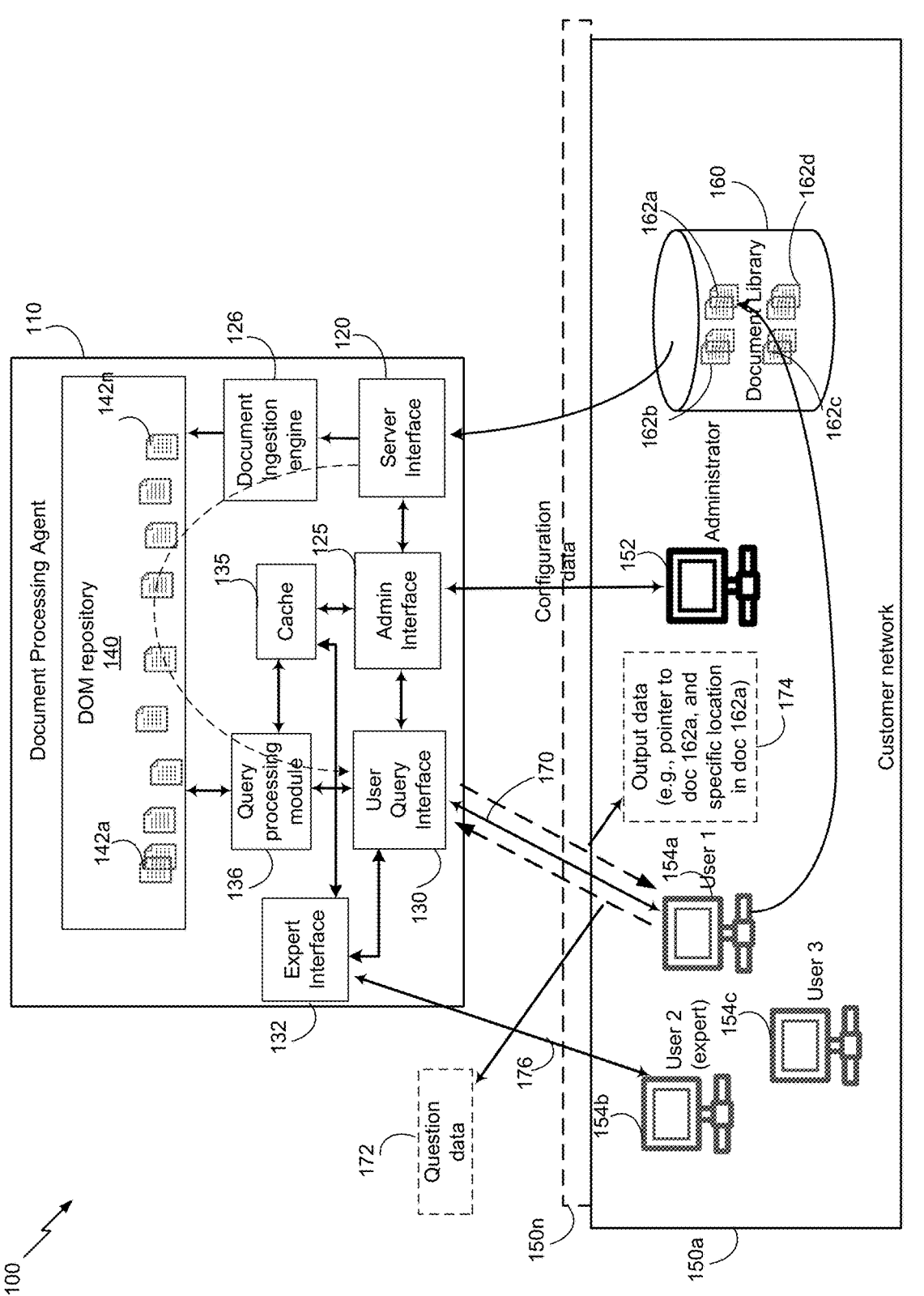
FIG. 1 is a diagram of an example Question-and-Answer document processing and response generation system.

With reference to FIG. 1, a diagram of an example system 100 for document processing and response generation, is provided. As will be discussed in greater detail below, the system 100 is configured to ingest source documents (e.g., a customer's voluminous library of documents, or other repositories of data such as e-mail data, collaborative platform data, etc.) to transform the documents to document objects (referred to as document object model, or DOM, documents) that represent a mapping from the source documents to searchable resultant objects (resultant transformed) documents. Those document objects may be stored in a DOM repository. A user associated with the customer that provided that document library (e.g., an employee of the customer) can subsequently submit a query (e.g., a natural language query, such as "how many vacation days does an employee with 2 years seniority get a year?") that is processed by the system 100, and, in situations where a quick answer is not otherwise available from a cache for commonly-asked-questions, the query is processed and transformed into a format compatible with the format of ingested documents to identify portions in one or more of the ingested documents that may contain the answer to the user's query. The system then returns, to the user, output data that includes for example, a pointer to a location within one or more of the source documents (corresponding to the identified one or more ingested documents) which the user then accesses directly to retrieve an answer to the query. The output may alternatively, or additionally, include, in some embodiments, the answer to the user's query and/or a portion of a document, e.g., a paragraph, that contains the answer. Advantageously, the output returned to the user does not need to (although, in some examples, it may, if desired) include the specific information sought by the user, but rather just includes a pointer to a portion of source document stored in a secured site that cannot be accessed by parties not authorized to access that source document. This answer-determination approach therefore enhances the security features of transmitting sensitive information (e.g., confidential or private).

In some embodiments, searching the document object repository to find an answer to a query typically includes two operations: (1) first, a process referred to as Fast-Search or Fast Match (FM) process is performed, and (2) the Fast-Match process is then followed by a process called Detailed-Search or Detailed-Match (DM) process (also referred to herein as "fine-detail" search). Both the FM and DM processes can be based on BERT (Bidirectional Encoder Representations from Transformers) models. In the FM case, the model results (in some implementations) in, for example, one vector for a query and one vector for one paragraph (e.g., 200 words window, which may also include contextual data). In the DM, there are typically multiple vectors per query or per paragraph, in proportion to the number of, for example, words or sub-words, in the query or paragraph.

It is to be noted that, in some embodiments, the transformations of the query and/or the source documents may be performed at a customer's network, with the transformed query and/or transformed content then communicated to a central server. Such embodiments can improve privacy and security for communicating sensitive data across networks since resultant vectors (derived through the transformation of content or query data) are created in the secure space of the customer (client), and consequently only the resultant transformed vectors (rather than the actual content or query data) are available or present at the centralized cloud server. The transformation of the content or query data at the client's device can act as a type of encryption applied to the data being transformed and will thus result in secure processing that protects the data from attacks on the server cloud. In some embodiments, the data being transformed at the client's network can additionally be encrypted to provide even further enhanced secured communication of the client's data (be it source data or query data).

System Architecture and General Operation

The general architecture of a document processing and searching system 100 and the processes it implements is next provided. Intricacies of the implementations details for the various modules, units, and processes of FIG. 1 will further be discussed in greater detail later in the present disclosure. Thus, as shown in FIG. 1, the system typically includes a document processing agent 110 (which may be an AI-based agent) in communication with a customer's network 150a (which is one of n customer networks/systems that access, in the example system 100, the document processing agent 110). The document processing agent 110 can be implemented as an independent remote server that serves multiple customers like the customer systems 150a and 150n, and can communicate with such customers via network communications (be it private or public networks, such as the Internet). Communication with customers' units is realized via a communication unit comprising one or more communication interfaces (such as server interface 120, admin interface 125, user query interface 130, and/or expert interface 132, all of which are represented schematically in FIG. 1), which would generally include communication modules (e.g., transceivers for wired network communications and/or for wireless network communication, with such transceivers configured according to various appropriate types of communication protocols). Alternatively, the document processing agent 110 does not need to be located at a remote location, but may be a dedicated node within the customer network (for example, it can be implemented as a process running on one of the customer's one or more processor-based devices). An arrangement where the agent 110 runs out of the customer's network (such as any of the customer networks 150a-n) may improve data security, but may be more expensive to privately run.

Yet in other alternative embodiments, some portions of the system (e.g., the ingestion units configured to perform the pre-processing and vectorization operations on source documents and/or on queries submitted by users) may be located inside the firewall of a customer's network, while storage of ingested document (and optionally search engines to search ingested content) may be located outside the customer's network's firewall (e.g., on a centralized cloud server(s)). In such alternative embodiments, data sent to the cloud servers (e.g., to perform the search at a centralized location) may already have been processed into encoded (ingested) content (e.g., through vector processing that may have been implemented through coarse transform, e.g., applied to fixed sized input segments, and/or fine-detail numerical transforms applied to smaller portions than the portions processed by the coarse transformer) that is unintelligible to third parties unauthorized to make use of the data, thus adding another measure of privacy and security protection to data that is to be processed using the system 100. In these alternative embodiments, the initial part of the processing of the input query may also be processed inside the customer network's firewall. In addition to performing the transformation (of the source content and/or the query) within a client's firewall, such transformed data may further be encrypted (using symmetric or asymmetric encryption keys) before being transmitted to the document processing agent 110, thus increasing the level of security/privacy realized for communications between a customer's network and the centralized document processing agent (which serves multiple customers).

In some embodiments, the example customer network 150a may be a distributed set of stations, potentially with a dedicated secured gateway (protected by a firewall and/or other security measures) that can be controlled (from a station 152) by an administrator. The customer generally has amassed a large volume of electronic documents (including, e.g., technical documentation relevant to the customer's operations, administrative documents such as Human Resource documents, and all other types of written documents in electronic form). The documents are arranged in a document library 160 (which may be part of the computing of the customer network 150a), and are accessible by various authorized users at user stations 154a-c within the network 150a, and by administrator (via an administrator station 154). Any number of stations may be deployed in any particular customer network/system. The administrator station 152 can control access to the documents in the library 160 by controlling privileges, and otherwise managing the documents (e.g., access to specific documents within the library 160, management of content to conceal portions that do not comply with privacy requirements, etc.) As will be discussed in greater detail below, in addition to the library 160 (containing documents relating to operation of the entity operating on the network), other sources of data or information may be available from various applications employed by the customer (e.g., an e-mail application, a chat application such as Slack, customer relationship applications such as Salesforce, etc.) to process through the document processing implementations described herein.

The administrator station 152 is configured to communicate with the document processing agent 110 via, for example, an admin interface 125. Among other functions, the administrator can provide the document processing agent 110 with information identifying location of the source document in the repository (library) 160 maintaining the plurality of source documents, control configuration and operation of the functionality of the document processing agent 110 in relation to the customer network 150a, review data produced by the agent 110 (e.g., override certain answers), provide the document processing agent 110 with training data, etc. As noted, communication between the station 152 and the admin interface 125 can be established based on any communication technology or protocol. To enhance security features, communications between the document processing agent 110 and the administrator station 152 may include authentication and/or encryption data (e.g., using symmetric or non-symmetric encryption keys provided to the document processing agent 110 and the administrator station 152). Via the communication link established between the administrator station 152 and the interfaces 120 and 125, the administrator provides information necessary for the document processing agent 110 to access the document library. For example, the administrator station can send a message providing the document processing agent 110 with a network address for the document library 160 (and/or identity of documents within that library that the agent 110 is to access and process). The administrator station can, in turn, receive an encryption key (e.g., a private symmetric key, or a public key corresponding to a private key used by the agent 110) that is to be used to encrypt content of documents that are to be transferred to the agent 110. The communication between the administrator station 152 and the admin interface 125 (or any of the other interfaces, such as interfaces 120 and 130, with which the administrator can communicate) can also be used to establish other configuration settings controlling the exchanges of data and information between the customer network 150a and the document processing agent 110, as will be described in greater detail below.

Once the AI agent has been provided with the location (e.g., represented as a network address) of the document library 160, and the communication features controlling the transmission of data between the customer network 150a and the agent 110, the agent 110 can begin receiving data transmissions of the documents from the repository (library) 160. The administrator station 152 can control the content sent, and perform some pre-transmission processing on the documents to be sent to the document processing agent 110, including removing sensitive content (e.g., private details), encrypting the content (e.g., using a public key corresponding to a private key at the document processing agent 110), authenticating the data to be transmitted, etc. The document processing agent 110 receives data transmitted from the customer network 150a via the server interface 120, and performs data pre-processing on the received data, including authentication and/or decryption of the data, format conversion (if needed), etc. The server interface 120 then passes the data corresponding to the documents sent from the document library 160 (subject to any pre-processing performed by the interface 120) to a document ingestion engine 126 that processes the received documents to transform (convert) them into a representation that allows the determination and generation of answers to queries provided by a user of the network 150a. Typically, prior to applying the transformation(s), the source document is segmented into portions (e.g., 200-word portions, or any other word-based segment), with the segmentation performed according to various rules for adjoining content from various parts of the documents into discrete segments. An example of a pre-processing (i.e., pre-transformation) rule is to construct segments using a sliding window of a fixed or variable length that combines one or more headings preceding the content captured by the sliding window, and thus creates a contextual association between one or more headings and the content captured by the window. Such a rule ensures that the transformation performed on a segment combines important contextual information with content located remotely (e.g., farther down the source document) from the segment being processed.

Having segmented the source document, and/or or performed other types of pre-processing (as will be described in greater detail below), the document ingestion engine 126 is configured to apply one or more types of transformations to the document segments to transform the segments into searchable segments (e.g., question-and-answer searchable segments). One type of transformation that can be applied to the segment is based on transforming the fixed-sized (or substantially fixed-sized) segments, typically comprising multiple words/tokens, into numerical vectors in order to implement a fast-search process. Such a search is typically a coarse search, in that it generally returns (in response to a query submitted by a user) a relatively high number of results (hits) because the search is based on matching vectors produced from input data comprising a relatively large number of words (tokens or features), and as a result the resolution achievable from such a transformation is lower than what can be achieved from transforming smaller segments. Thus, results based on coarse vector transformations might not provide as accurate representations of the textual meaning of the transformed content as other transformations applied on smaller segments. On the other hand, as the name suggests, the fast-search can be performed relatively quickly, and thus may be used to winnow the possible candidates of possible answers (to the submitted query) to a size or number that can then be more carefully searched (possibly through a search based on another type of transformation). Another transformation that may be applied by the ingestion engine is one for generating fine-detail vector transformations that are used to more narrowly pinpoint locations of answers with some text-segment (e.g., paragraphs) specific answer word sequences. Generally, document segments on which the fine-detail transformations are applied may be at a finer grain (resolution) than fast-search segments (which are generally of a fixed size, e.g., 200 words, and thus cannot typically pinpoint the exact location of an answer, if one exists, within the segment).

More specifically, a fast-search transformation (e.g., implemented through neural networks, filters, etc.) is applied to the segment to yield vectors with values that are based, and therefore are representative of, the content of the document segments. As will be discussed in greater detail below, several approaches may be applied by the document ingestion engine 126 to transform the data according to the fast-search transformation. In one example, the data representative of the content may be transformed into vector representations (e.g., fixed size vector, or variable size vectors). Thus, in such an example, the transform converts textual content into a vector of numerical values, which may or may not be associated with metadata (e.g., text-based metadata, providing additional information that can be used for further processing) or other contextual information. The resultant transformed vector can be representative of possible questions and answers that are associated with the input segment that was transformed. An example of a transformation that yields such vector-value representative of the content of the input (including contextual relationships) is the Bidirectional Encoder Representation from Transformers (BERT)

For the fine-detail transformation performed by the document ingestion engine 126, the source data (e.g., text-based portions segmented from a source document according to one or more rules or criteria, with the segmented portions typically being smaller in size than the source segments used for the fast-search transformation) is typically transformed into multiple vectorized (numerical) transformed content. The fine-detail transform may also be implemented according to BERT. The processing by the document ingestion engine 126 can include natural language pre-processing that determines at least some linguistically based information, such as detection and recording of locations of named entities (e.g., person and company names) in the document, expansion of structured data, such as tables, into searchable form of equivalent text, information conversion into knowledge representations (such as a predefined frame structure), etc. In some embodiments, the resultant fine-detail transformed data may be combined with the original content that is being transformed, along with derived or provided metadata (although such metadata is not critical, it can facilitate the performance of intelligent searching and question answering for a document). In some examples, the combination of the transformed content and the source segment can be further augmented with automatic questions that may be germane to the source segment, so that these generated questions are combined with the particular segment (or in a particular location in a full document that includes the entirety of the source content and the corresponding transformed content), or with a particular information field. When processing questions from a user, a similarity between the user's question and such automatically generated questions can be used to answer the user's question by returning the information (e.g., a pointer or actual user-understandable content).

With continued reference to FIG. 1, ingested content produced by the document ingestion engine 126 is stored in document object model (DOM) repository 140. The repository 140 is typically implemented on one or more data storage devices (distributed, or available at a single local location) that can be accessible from multiple access/interfacing points between the repository 140 and other modules/units of the document processing agent 110. In the diagram of FIG. 1, the repository 140 is depicted as having two access points, with one access point being a one-directional link between the ingestion engine 126 and the repository 140 (i.e., a link to allow writing content from the engine 126 into the DOM repository 140) and a bi-directional access point connected to a query processing module 136 that provides query data to the DOM repository 140 (in order to search the DOM records stored in the repository) and to receive search results that are forwarded to the user (optionally after some further processing) that submitted the query. In some embodiments, the access point to the repository can be implemented as a single point connected to a module configured to perform the query processing and the document ingestion operations.

The DOM repository 140 is configured to (in conjunction with the document ingestion engine (also referred to as ingestion agent) 126 and/or the query processing module 136) store, manage, and search DOM records 142*a-n*. Content of a DOM record typically depends on the transformation performed by document ingestion engine 126. A DOM record can include data items associated with a particular source document or a source document portion. For example, one DOM record may be a collection of items that includes an original portion of a source document, metadata for that source document portion, contextual information associated with that source document portion, a corresponding coarse vector(s) resulting from a transformation applied to one or more fixed-sized (or substantially fixed-sized) segments of the original portion of the source document (to facilitate a fast-search process), a corresponding resultant fine-detail transformed content resulting from a fine-detail transformed (to facilitate a more accurate and refined textual search), etc. Thus, if the transformation resulted in a vector of values representative of the textual content of a segment, that vector is stored in the repository, possibly in association with metadata (added or embedded into the vector), and/or in association with the original content (in situations where the actual original text-content is preserved; in some embodiments, for security or privacy reasons, the source content may be discarded upon its ingestion, or may be available only at the customer's site). Metadata associated with the transformed content may include contextual information associated with the original source content, and location information that indicates the location or position of source content that resulted in the transformed content within the larger source document. Such location information can be provided in the form of pointer information pointing to a memory location (or memory offset location) for the source document stored in the customer network (i.e., so that when the pointer information is returned to a requesting user, it can be used to locate the memory location where the relevant content constituting an answer to the user's query can be found).

The transformed content (which may include several transformed content items, resulting from the various transformations applied to segmented content), metadata, and/or source content stored in the repository 140 together may define a unified record structure, in which each of the transformed content, metadata, and/or original source content is a field or a segment of the unified record structure. Individual records, when they correspond to discrete document segments of a larger source document, can be associated with each other (e.g., by arranging them sequentially or through logical or actual links/pointers) to define larger document portions (e.g., chapters for a particular document), or to define the entire original document that was segmented and ingested.

As further shown in FIG. 1, the document processing agent 110 further includes the query unit (also referred to as a query stack) that is configured to receive inputs (data representative of queries from one or more users authorized to submit queries in relation to at least some of the ingested documents arranged in the DOM repository 140), and in turn receive output data returned to the initiating user. The query stack includes a user query interface 130 (which may be similar to, or implemented using the same hardware and software as the server interface 120) in communication with a query processing module 136 (also referred to as a query engine). As will be discussed in greater detail below, the query processing module may include a transform engine to apply to queries submitted by users similar transformation(s) to generate transformed query data that is compatible with the transformed content in the DOM records 142*a-n* maintained within the DOM repository 140. The transformed query can include coarse numerical vector type transformed data that can be used to search numerical vector transformed content in the repository 140, fine-detail transformed query (that can be used to search similarly formatted fine-detail transformed content in the repository 140), or any other transformed format that may have been used to ingest the source document.

In embodiments in which the repository 140 includes multiple types of transformed source content, the search of the repository 140 may be implemented as a multi-pronged search. For example, because coarse numerical vector representation is generally more compact and easier to search (but may not as accurate as fine-detail transformed representations, whether achieved by a BERT-based transformation or some other transformation), a first prong of a search to determine an answer to a submitted query may be to convert the query data into coarse vector representation, and to use that first transformed query representation to search records in the repository 140 matching (e.g., according to some closeness criterion that may represent the distance, or difference, between the transformed vector query data and the transformed vector ingested content data) the coarse numerical-based transform of the query data. This type of initial searching may be referred to as fast-search. The results of the search may result in the identification of one or more answer candidates (e.g., identify 1000, or any other number, of possible segments that may contain an answer word sequence responsive to the query submitted by the user). The identified first batch of possible results can then be used to perform the second stage of the search by converting the query to a fine-detail transformed query and searching fine-detail transformed content associated with the search results identified in the first stage of the search process. This searching stage may be referred to as the detailed, or fine-grained, search. It is to be noted that, in some embodiments, the fast search may be used to identify the original portions of source content associated with the identified candidates, and those identified portions may then be transformed into fine-detail transform content. In such embodiments, the repository 140 does not need to maintain fine-detail transformed content, but rather the transformation of source content is done based on which portions have been identified by the fast-search as possibly containing an answer to the query. In alternative examples, searching for answer to a query may be performed directly on the entire fine-detail transformed content records without first identifying possible candidate portions of source content through a fast-search of fast-searched transformed content records.

Thus, in some embodiments, the query stack (e.g., the query processing module 136) is configured to transform the query data into transformed query data compatible with the transformed source content (e.g., compatible with one or more of the transformed content records in the DOM repository 140). For example, the fast-search-compatible transformation may be a coarse BERT-based transformation (e.g., using a learning engine implementing the same or similar trained learning model used to produce the searchable transformed content from the source data) that is applied to the entire query data (e.g., a natural language question) to produce a single vector result. The query processing module may, for example, launch a fast-search process in which it identifies one or more candidate portions in the transformed source content (with respective numerical vectors resulting from the coarse transformation) matching, according to a first criterion, the transformed query data. For example, the matching operation may be based on some closeness or similarity criterion corresponding to some computed distance metric between a computed vector transformed query data and various vector transformed content records in the repository 140. As described herein, in some embodiments, the transformed content may include vectors corresponding to possible questions that users may ask to which the source content provides a possible answer. The fast search may thus, in some embodiments, compare the transformed query result (generally a resultant vector record) to searchable vector records representative of possible questions that could be asked in relation to source content from which those searchable vectors were generated.

The query processing module 136 may be further configured to determine, from one or more fine-detail transformed content records corresponding to the one or more candidate portions identified based on their coarse transformed vectors, at least one fine-detail transformed content record matching, according to a second criterion (e.g., some other closeness or similarity metric), a fine-detail transformed data of the query data. Alternatively, in embodiments in which a fast-search is not performed, the query processing module 136 may be configured to identify one or more candidate portions in the transformed source content with respective fine-detail transformed content records matching, according to a second criterion, the transformed query data.

In some embodiments, the user query interface 130 and/or the query processing module may be coupled to a query cache 135 and a question generation unit (which may be part of the cache 135 or of the query processing module 136, or may be a separate unit). The query cache 135 stores, among other things, answers/contents corresponding to frequently asked questions. Such answers/contents may include content previously retrieved from the DOM documents (and/or from their corresponding raw source content) in response to previously submitted queries. Counters associated with such cached answers can track the frequency at which specific questions and answers have been submitted and/or retrieved. The cache 135 can also be configured to discard cached content that has not been requested within some reference (threshold) time interval. Content in the answer cache may also have been stored by the administrator (e.g., operating from a station, such as the station 152 via the admin interface 125) in anticipation of some likely questions that users of the customer system (network) 150*a* were expected to submit, or to override content that may have been retrieved from the DOM 140 (e.g., content that, based on subsequent feedback from users, was determined to be inaccurate or unresponsive to the query submitted). Thus, in some embodiments, the query stack is configured to determine whether received query data matches one of pre-determined questions (which may be stored in the answer cache), and to generate the output data based on one or more answer data records (possibly stored within the answer cache) in response to determining that the received query data matches one of the pre-determined questions. In some embodiments, the matching of query data to the past questions and associated answers stored in cache is performed by computing a score that is based on the combination of the questions and their answers, and ranking the computed scores to identify one or more likely matching candidates.

As noted, the query processing module may also include a question generation engine that can determine (e.g., based on a trained learning engine and/or using a repository of question data) follow-up or related questions to one or more questions submitted through the query data. In some embodiments, follow-up questions can be generated by paraphrasing the query submitted (e.g., transforming and/or normalizing the submitting query to modify the question submitted using, for example, a trained learning engine). In some embodiments, answer data determined for the submitted query (e.g., based on content retrieved from the DOM repository 140 via the query processing module 136) may be processed (by a separate module) to formulate further questions from the answer. Such derived questions can then be re-submitted to the query processing module to retrieve follow-up answers. This process can be iteratively repeated up to a pre-determined number of times. In some situations, the content stored in the DOM repository 140 may associate multiple questions (represented in whichever transformation format(s) that was applied during the document ingestion stage) with each processed segment of the source document (as noted, generation of transformed content may include, for each processed segment, data representative of questions associated with the processed segment, metadata, and content that may be provided in transformed format and/or the original source content). Thus, upon submission of a query (generally in transformed format computed, for example, according to a coarse-BERT or a fine-BERT type transformation), at least one DOM record/element will be identified. That search result may possibly be associated with multiple questions, including the question that may have resulted in a match between the identified resulted and the submitted query. One or more of the additional questions (i.e., other than the question that was matched to the query) may be used as a separate query to re-submit for searching to identify additional content that may be germane to the original query submitted by the user.

As further shown in FIG. 1, the determination of an answer to a query can be initiated by a user submitting a query 172 via a link 170 established between a station 154*a* and the user query interface 130 (as noted with respect to the links established to transfer source documents for ingestion, the links can be based on any type of communication technology or protocol, including wired and wireless communication protocols). The query 172 may be an actual unprocessed question submitted by the user, or may be partially or fully transformed (e.g., for privacy and security reasons). For example, the station 154*a* may apply a transformation commensurate with the transformation applied by the ingestion engine 126 (in which case, performing a similar transformation at the query stack may become unnecessary). Alternatively or additionally, authentication and encryption processing may be performed on the query 172. The query (question data) 172 is transmitted to the document processing agent 110, and is received at the user query interface 130. Upon receipt of the query, a determination may be made as to whether appropriate answers are available in the cache 135 of pre-determined answers. If there is a pre-determined questions-and-answer (e.g., the query data matches one or more pre-determined questions), one or more of the pre-determined answers in used to generate the output data (illustrated as output data 174) that is returned to the user via the link 170 (or through some other link).

Generally, though, the query data is transformed (if it was not already transformed at the station 154*a*) by the query stack into transformed query data. The transformed data may provide the query in one or more transform formats that are compatible with the formatting of the transformed source content stored in the DOM repository 140. In some embodiments, the query data may also be used to generate one or more additional questions (e.g., follow-up questions, or questions related to the original query submitted by the user). In situations where an answer to the query is available from an answer cache, that answer itself may be used as a basis for generating further one or more questions that may be related to the cached answer(s). The query or the transformed query is used to search, via the query processing module 136, the DOM repository 140. As noted, the searching may be performed as a multi-pronged process according to multiple transformation formats used to store data in the DOM repository 140.

The output generated in response to a submitted query generally includes a pointer to the source content available at the customer network 150*a*. Because the data stored in the repository 140 is ingested based on source documents maintained at a document library available at the customer network, to which the user submitting the query has access, and because the source document might not have been stored in their original form at the document processing agent 110 (e.g., for security reasons, in order to protect sensitive data from being compromised), the output that is returned to the user does not require that actual answer data be sent back to the user. Instead, the pointer returned as the output of the query can identify the address or location of the answer with the appropriate document available to the user at the user's network 150. For example, in the illustrated example of FIG. 1, the output data is shown as a pointer to the specific location of the answer in the document 162*a*. Such a pointer may thus include data representing the document 162, e.g., a network address or a memory location where the start of the document is located, and a specific location of the portion(s) of the document that represents the answer to the question asked by the user at the station 154*a* (e.g., a relative offset from the beginning of the starting location of the document 162, or an actual address or memory location where the starting point of the identified portion(s) is located). The pointer data provided in the output data may have been included in a metadata field of a DOM record that included transformed content data determined (e.g., by the query processing module 136) to match (according to one or more applied matching criteria) the query submitted by the user. In some embodiments, the output data may include, in addition to or instead of the pointer data, at least part of the source content corresponding to the at least one portion of the transformed content and/or a summary of the source content corresponding to the at least one portion of the transformed content.

Additional details regarding the operation of the system 100 depicted in FIG. 1 is provided with reference to FIG. 2, showing a flowchart of an example procedure 200 for document processing and response generation. The procedure 200 includes receiving 210, at a local device (e.g., the document processing agent 110 of FIG. 1) from a remote device (e.g., a station, such as the station 154*a* in FIG. 1, that is part of the customer network 150*a*), query data representative of a question relating to source content of a source document of a repository of a plurality of source documents (e.g., the document library 160 of the customer network 150*a*). The source content is associated with transformed content accessible from the local device (e.g., the transformed content stored in the DOM repository 140 of FIG. 1). As noted, in some examples, the local device refers to a device that may be located at one of, for example, a first network operated by a first party, with the first network being different from a second network on which the remote device is located, and with the second network being operated by a second party (i.e., the customer network is physically separate and remote from the network on which the document processing agent is implemented), or a third network on which the remote device is also located (i.e., the local device and remote device are both on the same network, e.g., in situations where the document processing agent remains within the customer's network in order to, for example, mitigate some security issues).

As further shown in FIG. 2, the procedure 200 further includes generating 220, in response to determination, at the local device (110), of a match between the query data and at least one portion of the transformed content, output data comprising one or more of a pointer to access, in the source document accessible from the remote device, at least one portion of the source document corresponding to the at least one portion of the transformed content, and/or a copy of the at least one portion of the source document (i.e., an actual user-readable answer). It is to be noted that a match between query data and the content being searched (in relation to the procedure 200, or any of the other procedures described herein) need not be an exact match, but may simply require some level (potentially adjustable) of similarity between the query data and the data portions being searched.

The pointer to access the at least one portion of the source document may include one or more of, for example, document identifier identifying the source document in the repository of a plurality of source documents (i.e., in the document library 160), network address of the source document in the repository of a plurality of source documents, starting and end locations of the at least one portion of the source document within the source document, and/or a word span. In some examples, the generated output data may further include one or more of, for example, at least part of the source content corresponding to the at least one portion of the transformed content, and/or a summary of the source content corresponding to the at least one portion of the transformed content.

As noted, in some examples, the at least one portion of the transformed content may be stored in a repository of document object model (DOM) data items. A DOM data item corresponding to the at least one portion of the transformed content may include the pointer to access the at least one portion of the source document, and one or more of, for example, at least one transformed element representative of the at least one portion of the source content, the at least one portion of the source content, and/or contextual information associated with the at least one portion of the source content. The contextual information associated with the at least one portion of the source document may include feedback data from one or more users indicating responsiveness level of the output data to the question relating to the source content of the source document (e.g., user feedback of whether responses to a query include good or bad answers).

The transformed content in the repository 140 is generated according to ingestion processes that include, for example, segmenting source content, and then applying one or more different types of transformations on the segments (e.g., coarse/fixed vector transformation for fast search according to a BERT-based transformation, a fine-detail transformation according to a BERT-based transformation procedure, which may similar to or different than the transformation applied to the coarse transformation, and/or other types of transformations that are implemented through learning engines or through filtering operations). Thus, in some embodiments, the procedure 200 may further include receiving a copy of the source document at the local device, segmenting the copy of the source document into a plurality of document segments, and transforming each of the plurality of document segments into one or more respective transformed segments according to one or more transformations. An administrator may provide the document processing engine (e.g., via the admin interface 125 of FIG. 1) information about where the source document can be found. Thus, the procedure may also include receiving from an administrator information identifying location of the source document in the repository of the plurality of source documents.

The one or more transformations may include one or more of, for example, a coarse linearization transform to generate numerical vectors representative of content of the plurality of document segments, and/or a fine-detail transformation to generate fine-detail transformed content records representative of the content of the plurality of document segments. Either of the coarse (also referred to as "fast-search") or fine-detail transformation may be vectorized transformations (derived using, for example, neural networks), applied to one or more document segments, based on Bidirectional Encoder Representations from Transformers (BERT) processing. The coarse transformation is typically applied to fixed-sized (or substantially fixed sized) source data segments that are larger in size than the segments to which the fine-detail transformation is applied. In addition to the BERT-based transforms applied to source data and queries, additional types of transforms (whether utilized for fast-searching and/or detailed-searching) may be used (e.g., transformations to implement other NPL approaches such as Word2Vecot, GloVe, etc.)

In some embodiments, the procedure 200 may also include transforming the query data into transformed query data compatible with the transformed source content. In such embodiments, the procedure may additionally include implementing a fast-search by identifying one or more candidate portions in the transformed source content, produced through the coarse transformation process, matching, according to a first criterion, the transformed query data. Fine-grained searching may then be applied to the candidate portions identified by the fast-search. Thus, the procedure may further include determining, from one or more fine-detail transformed content records corresponding to the one or more candidate portions identified based on their respective coarse numerical vectors, at least one fine-detail transformed content record matching, according to a second criterion, a fine-detail transformed data of the query data.

In some examples, fine-grained searching is performed without first performing a fast-search. Thus, in such examples, the procedure may include identifying one or more candidate portions in the transformed source content with respective fine-detail transformed content records matching, according to a second criterion, the transformed query data.

In some examples, transforming the each of the plurality of the document segments may include transforming the each of the plurality of the document segments using a trained neural network implementing the one or more transformations. Segmenting the source content into the plurality of document segments may include segmenting the source content into the plurality of document segments according to one or more pre-processing rules. The segmenting can be performed so that context (e.g., heading information, font information, other metadata information) is added to the contents in the segments that are to be transformed. Thus, in such situations, segmenting the source content may include segmenting the source content into the plurality of document segments according to hierarchical rules semantically associating one portion of the source content with one or more other portions of the source content.

In some examples, the procedure may further include retrieving augmented data associated with the received source document, and segmenting a combination of the source document and the augmented data into the plurality of document segments. The data augmentation may be based on links found in the source document. Thus, retrieving the augmented data may include retrieving the augmented data based on links included in the source document.

The procedure 200 may further include transmitting the output data to the remote device. In some embodiments, additional questions may be generated. Thus, the procedure may also include identifying based on the received query data representative of the question one or more additional questions, from a repository of query data representative of a plurality of questions associated with source documents, to apply to the transformed content.

In some situations, answers to queries can be provided from a Q-A cache. Accordingly, the procedure 200 may include determining whether the received query data matches one of pre-determined questions, and, in response to determining that the received query data matches one of the pre-determined questions, generating the output data based on one or more answer data records associated with the matched one of the pre-determined questions.

As noted, document ingestion may be performed according to a fine-detail transformation (such as BERT, which in some embodiments may be a two-leg-BERT implementation as described in greater detail below). Thus, in some examples, the procedure 200 may further include partitioning the source content into one or more content portions, and transforming the one or more content portions according to a fine-detail transformation to generate fine-detail transformed content records representative of contents of the one or more content portions. The fine-detail transformation may include a transformation, applied to one or more document segments, based on Bidirectional Encoder Representations from Transformers (BERT) processing. Transforming the at least one of the one or more content portions may include transforming the at least one of the one or more content portions into transformed content based on one or more ground truth samples of question-and-answer pairs. In some embodiments, document summarization may be realized by picking up good sentences that are close to a summary sentence. Thus, in such embodiments, the procedure 200 may further include deriving a summary of the source document based on the transformed one or more content portions according to the fine-detail transformation. Deriving the summary may include identifying at least one of the transformed one or more content portions with a level of similarity to a pre-determined summary portion that exceeds a similarity threshold.

Source Document Ingestion: Pre-Processing and Content Transformation

As noted, to facilitate Q-A content searching, source documents are ingested (e.g., via the document ingestion engine 126 of FIG. 1, which receives the source content for a source document via, for example, the server interface 120) to produce transformed content that is stored as part of a library of DOM (document object model) objects. The ingestion involves various pre-processing operations performed on the content, e.g., to divide the source documents into segments of a manageable size, while preserving as much germane contextual information. Thus, the document ingestion engine is configured to receive a source document, applying one or more pre-processes to the source document to produce contextual information representative of the structure and content of the source document, and transform the source document, based on the contextual information, to generate a question-and-answer searchable document.

In the example of FIG. 1, source content, to which ingestion processes described herein are applied, includes the document repository of documents in the library 160 located in the customer network 150*a*. However, there can be many other sources, whether within the customer network 150*a*, or elsewhere, whose data corpus constitutes part of the customer's knowledge base, and that can be processed in a manner similar to the processing performed on documents in the library 160 in order to capture and preserve in Q-A searchable form that knowledge. Examples of such additional sources include: a) data stored in collaboration systems such as Slack, MS Teams, MS productivity Suite (Office 360), Google G-Suite and alike (traditional e-mail servers, storing e-mail communication between specified senders and recipients may also be processed to capture relevant data), b) data stored inside enterprise SaaS applications such as SalesForce, ServiceNow, etc., c) data inside web pages of different websites and different web applications, be they customer-facing web applications, employee-facing web applications, etc.

Ingestion of documents can be based on the specific source of data and/or on the desired or intended presentation of information (e.g., presentation of response data returned in reply to query data submitted by a user). For example, where the source of data (the content) is from some specialized application (Salesforce, Slack, etc.), the ingestion of the source content may be configured to perform specialized or dedicated pre-processing required for the specific source, e.g., convert chat data, or data arranged in specialized format records, such as records of Salesforce, into prose, or some other format more conducive to the transformations applied to segmented portions of the source content.

With respect to ingestion that is based on (or takes into account) the particular way the response data is to be presented, consider the following three examples of ways to achieve the data presentation. In a first example approach, data is presented according to an API-based methodology, where, for example, the answer/paragraph is included in addition to the location (such as page number or begin/end positions of the answer snippet) provided to a renderer of different format types (such as HTML, PDF, Word doc., etc.). The renderer can be implemented as a macro or plug-in/extension that allows for locating the answer snippet and paragraph in the document, and performing special processing of rendered segments e.g., by bolding or highlighting portions of the data, etc. of the segments. Another example approach for presenting response to data is to preserve, during the document processing phase (e.g., via the ingestion engines), screen shots of segments in the documents that are candidates for presentation (e.g., effectively, pre-rendering the output content). During a subsequent presentation of data identified as being responsive to a query, a client application can pick the most appropriate screenshot that holds the snippet/paragraph. In a third approach to present query results, after the appropriate segmentation for presentation is created, every segment of the processed documents, which may be available in different formats (e.g., as a Word doc, html, etc.), is converted to a PDF document format that includes the segment (with appropriate connections to the retrieval segments, where one-to-one mapping between segments are achieved and begin/end position of the answer snippet are passed through the API to a common PDF renderer) that allows for locating and highlighting the answer snippet.

Figure 3:
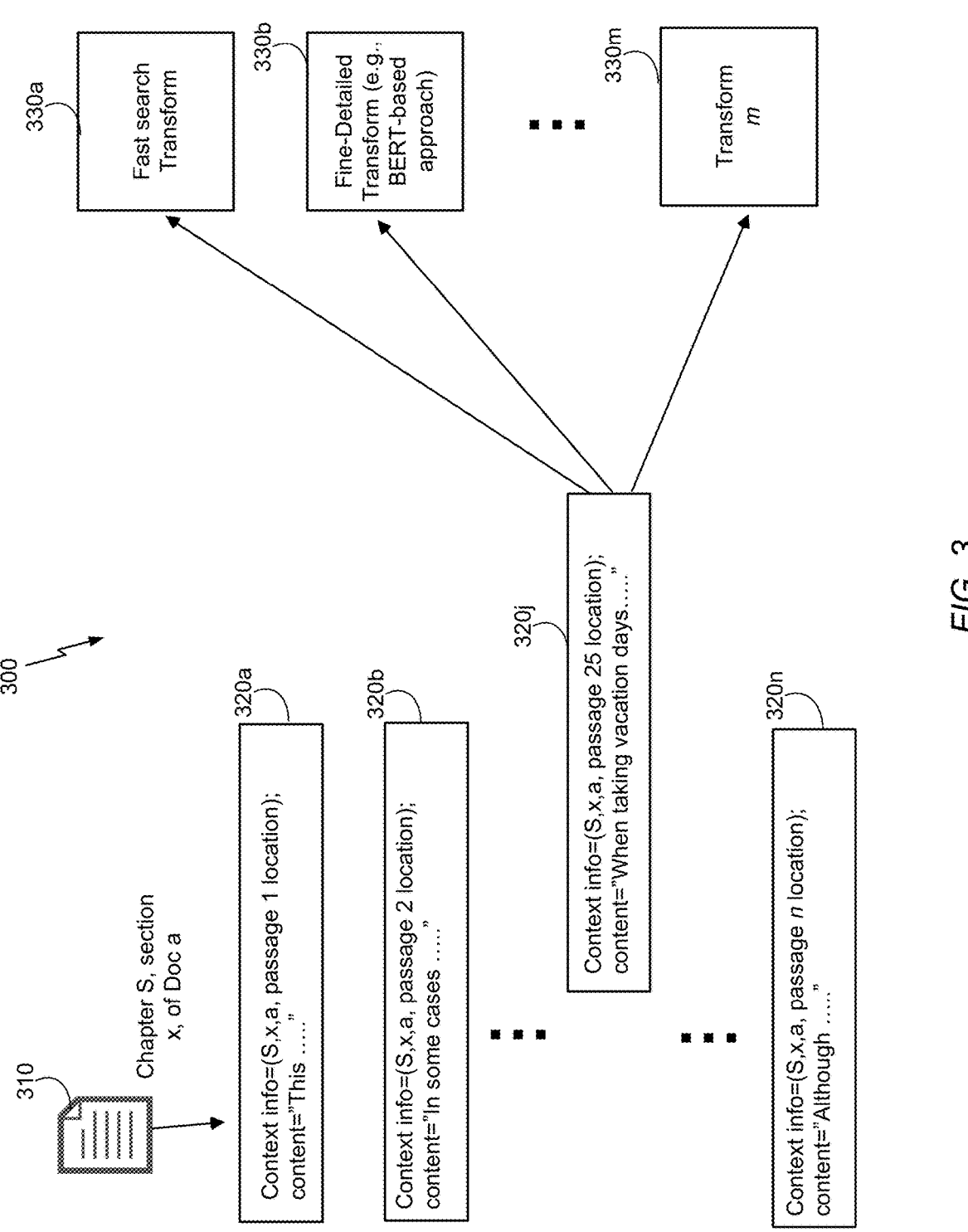
FIG. 3 is a diagram of an example document ingestion procedure.

One example of a pre-processing procedure is the segmentation of source content for a source document into multiple document segments. Such segmentation can be performed according to hierarchical rules semantically associating one portion of the source document with one or more other portions of the source content. For example, a sliding window of a fixed or variable size (e.g., 200 words) can be applied to the source content to generate manageable-sized segments on which to apply content transforms. However, when segmented into small chunks, the content segments may lose important contextual information that otherwise would have been available for a larger size segment. For example, a passage in the middle of a section of a document may, in isolation, not include important contextual information such as the section heading, location of the passage relative to earlier passages in the section, font sizes associated with other passages not captured by a particular segment (e.g., whether the present passage is a footnote), etc. Therefore, in some embodiments, contextual information (e.g., section heading, chapter heading, document title, location, font type and size, etc.) may be combined with one or more of the document segments. This pre-processing procedure is illustrated in FIG. 3, providing a diagram of an example document ingestion procedure 300. In FIG. 3, a source content 310 (which may be part of a source document) has been segmented into segments 320*a-n*. Each segment has its own individual segmented content (resulting from applying a segmenting window to the source content), that is combined with contextual information (which may be text information, numerical information, or both) associated with each segment. As can be seen, at least some of the contextual information, namely the document identity ("Doc a"), the Chapter information (Chapter S), and the heading information (section x) is common to the segments illustrated in FIG. 3. This allows the transformation that are subsequently applied to the segment to preserve at least some of the contextual information, and thus preserve some of the relevance of the segment being transformed to the subject matter.

In some examples, to simplify the segmentation process (so as to facilitate more efficient searching and retrieval), the source documents may be segmented to create overlap between the sequential document segment (not including the contextual information that is separately added to each segment). Thus, for example, in situations where a segment is created by a window of some particular size (constant or variable), the window may be shifted from one position to the following position buy some pre-determined fraction of the window size (e.g., ¾, which for a 200-word window would be 150 words). As a result of the fractional shifting, transformations (e.g., linear vectorization of BERT-based transformations) applied to overlapped segments results in some correlation between the segments, which can preserve relevancy between consecutive segments for subsequent Q-A searching. In some embodiments, heading information (and other contextual information) may be added directly to partitioned segments. Alternatively, heading and contextual information may either be transformed into vectors that are then added to the vectors resulting from transformation operations applied to the content extracted by the sliding window, or may be combined with the content extracted by the window before the transformation is applied to the resultant combined data. By associating neighboring segments with each other (e.g., through fractional shifting of the window over a document to form the segments), identification of relevant paragraphs (responsive to submitted queries), for the retrieval and presentation processing for top paragraphs and associated answer snippets, is improved.

Another pre-process that can be applied during segmentation of the source document relates to the handling of table information (i.e., when the original content is arranged in a table or grid). This pre-processing is used expand structured data arranged in tables (or other types of data structures) into searchable form such as equivalent text. For example, upon identifying a portion of the source document as being a multi-cell table, substitute portions are generated to replace the multi-cell table, with each of the multiple substitute portions including a respective sub-portion content data and contextual information associated with the multi-cell table. Additional examples of pre-processes include a procedure for associating contextual information with one or more portions of the source document based on, for example, a) information provided by a user in response to one or more questions relating to the source document that are presented to the user, and/or b) based on one or more ground truth samples of question-and-answer pairs.

In some examples, contextual information might not be explicitly included with a segment, but instead may need to be discovered, and included with document segments as augmented information (in this case, augmented contextual information). For example, entity discovery (determining identity of relevant entities referenced in the document) can be used to help speed up the search (fast-match (FM) searching, or detailed match (DM) searching) during inferencing, and to improve searching accuracy and generate an improved schema.

Consider the following example implementations:

Each search unit (e.g., 200-word windows, paragraphs, documents, etc.) is analyzed with respect to the inherent entities associated with the search unit, and also analyzed with respect to metadata associated with entities for a particular task (e.g., HR, author, organization etc.)

Each search unit is tagged with the appropriate inherent and metadata entities.

During the search, different heuristics can be used which could eliminate many of these search units by identifying them as irrelevant to the query at hand. For example, in one use case, where the user's question is determined with a high degree of confidence to relate to some specific subject matter (e.g., because the user explicit identification of the subject matter, e.g., a question stating "I have a financial question," or because the subject matter can be inferred, through rules or classification engines, to pertain to the particular subject matter), all documents/document objects for other subject matters (HR, security, etc.) can be eliminated from further consideration, and those documents do not need to be searched in response to the submitted query.

The by-product of such filtering is to speed up the FM and DM searching. Additionally, potential answer units from irrelevant categories do not create mis-recognition errors, and consequently this helps to improve the accuracy of searches.

Information about a specific entity (or entities) relevant to a user's search can also be used to generate more accurate additional questions (e.g., to determine different ways to paraphrase the input query so that additional possible question-answer pairs can be generated), and also to provide additional context that can be used to search the repository of data (be it DOM objects in transformed form, or user-readable data formatting).

Entity contextual information may also include information about specific items (e.g., different product brands) and elements that provide additional contextual information to refine the search and improve output results. For example, consider a situation in which a user is interacting with an augmented reality system equipped with cameras (and/or other types of sensors). In such a system, one or more of the cameras will be pointing at location that the user is looking at. Information in the scene captured by the sensor device (e.g., image data, which can be processed by, for example, a learning machine to identify objects and items appearing in the scene) can be used to provide contextual information to a query concomitantly initiated by the user. For instance, if the user looks down (and a camera of the augmented reality system similarly follows the direction and orientation of the user's head to point at the scene being viewed by the user), sees a MagSafe charger (for wireless charging) for his/her phone, and asks "how do I charge my phone?," a Q-A system (e.g., based on the implementations described herein) will identify different answers for this questions (resulting from a search of the DOM repository) than would be identified if the user were looking down and seeing a car. That is, the sensor of the augmented reality system is used to determine (or discover) contextual information (e.g., proximity of the user to a MagSafe charger vs. proximity to a car), and perform a search that relies, in part, on that determined contextual information.

In some embodiments, the orientation, positioning, and or location (as may be determined based on positioning techniques using satellite or ground-based signal analysis) of the sensor device (the camera, in this case) can itself provide important contextual information that is germane to a search of the repository data. For Example, pointing the camera in a downward direction can imply that the information being sought via a query relates to objects that are situated close to the ground. In another example, location of the sensor device can be used to limit the search to answers that have relevance to the particular geographic location of the sensor device (e.g., to determine details related to a specific conference room where the user is located). Thus, a query such as "how do I turn on the video conference camera?" can be modified (or be restricted) to search answers (e.g., from relevant manuals or other source documents stored by the company) for the video camera(s) located within the particular conference room where the user posing the query is located.

Another example where augmented reality systems (or other types of systems equipped with sensors) can be used in conjunction with the document processing (e.g., Q-A type processing) implementations described herein involves situations where factory workers, who may be fitted with streaming bodycams (or hard-hat-cams), can pose queries questions that are modified by contextual information extracted from the captured video stream. A user may, in one situation, ask information about functionality or operation of a "machine," or information about a certain "product." The captured image or video by the device carried by the user can identify the particular brand or model of the machine, and, when the user is asking for some specific information about the operation of the machine, the specific model identified through the augmented reality sensor can be used to restrict the search to documents (e.g., user manuals) relevant to the specific machine model identified. Thus, streaming by a camera when used in an augmented reality system adapted to assist factory workers can be used to modify queries (e.g., seeking information about "a machine") to account for the specific machinery identified according to the video streams generated by a camera (used in conjunction with a learning machine to identify objects and items in the scenery). In another example related to the factory-worker (or technician) scenario, a user may pose a query (e.g., through a voice-based interface, such as an AI assistant app operating on a mobile device carried by the user) asking about the connectivity of a wiring harness. The query may be modified (or restricted) to search answers that may be specific to a wiring harness appearing in a captured image (or video) of the scene, from which the specific model or type of the harness can be identified.

Another example where captured image-based data can be used in the course of contextual discovery is when the scenery includes recognizable codes (such as QR codes, barcodes, etc.) that can be decoded to extract meaningful contextual information therefrom. For example, in the above wiring harness example, the wiring harness may include a label with a QR code or a barcode that can be automatically decoded upon being captured by the image-capture device carried by the user. Queries then posed by the user in relation to the wiring harness will be modified (or restricted in some way) so that the answer(s) obtained are relevant to the QR or barcode identified during the context discovery.

It is to be noted that some of the example systems (e.g., augmented reality systems) described herein can be implemented using augment reality goggles (glasses), while other systems can be implemented using cameras installed on smartphone that the user moves to point the camera in the direction of the relevant scenery. Some embodiments of such phone-based augmented reality system may also include an Artificial Intelligence (AI) assistant app (e.g., Siri, Alexa, Cortana, etc.) through which the user may provide his/her queries that are modified based on contextual information determined from the augmented reality system. It is also to be noted that other types of mix-mode input sources to formulate queries (in the course of searching Q-A data repository) can be used, that may combine inputs from one or more of text-entry sources, voice-capturing sources, image-capturing sources, etc.

In some embodiments, document processing (e.g., segmentation) can be performed as two separate tasks. In one processing task, the source document is properly segmented and organized into small chunks, e.g., paragraphs, with additional augmentations (e.g., the vector sequence that represents the heading of a section can be appended to the vectors of every paragraph in that section). These augmentations are used to improve the retrieval accuracy. In a parallel task, a document is segmented in the most appropriate way for presentation purposes. The two different resultant segmentation outputs need to be associated with each other such that when, during retrieval processing, the top paragraphs and associated answer snippets are identified, but what is presented to the user are the presentation contents (rather than the identified answer snippets) associated with the identified answer snippets. In other words, the system can ingest a particular passage to facilitate searching operations, and separately ingest that particular passage to facilitate presentation operations. In this example, upon identifying the passage as a result of matching a query to the searchable ingested content, the presentation content associated with the identified passage is outputted.

Having segmented a source document into multiple segments, each segment may be provided to one or more content transforms (or transformers) 330*a-m* that transform the segment (content, and optionally the contextual information, although in some embodiments the contextual information may be preserved without transforming it) into a resultant transformed content that is associated with question(s) and answer(s) related to the original content of the respective segments. In the example of FIG. 3, m transforms are shown, each being applied to any one of the segments (such as the segment 320*j*). Although the same segment, for example 320*j*, is shown as being provided to each of the transforms, in some embodiments, different segmentations procedures may be applied to obtain segments of different sizes and configurations as may be required by each of the individual transforms (e.g., the coarse fast-search transform 330*a* may be configured to be applied to a segment of a first segment size, while the fine-detail transform 330b may be configured to be applied to a segment of a second, different size (e.g., strings of several words)).

As noted above, an example of transforms that may be applied is the fast search (also referred to as a fast-match, or a coarse search) transform that is based on transforming fixed-sized (and typically large) segments of input data into vectors (the vectors too may be, but do not necessarily have to be, of uniform dimensions). The resultant transformed vectors can be representative of possible questions and answers that are associated with the input segment that was transformed. The resultant vectors generally provide a starting point to narrow the number of possible document objects that need to be searched more thoroughly (e.g., using content transformed according to another, more fine-grained, transforms). For example, upon searching the transformed content repository (e.g., the DOM repository 140) based on a match between the fast-search transform results and query data converted into a representation compatible with the fast-search transformed content, the resultant search can result in, for example, 1000 potential candidates (or any other number of candidates). More refined content matching can then be performed on transformed content objects that correspond to the candidates identified by searching the fast-search transform content. The fast-search (coarse) transformation may be implemented according to the BERT-approach. Another transform, illustrated as being performed by transform unit/module 330b in FIG. 3, is the fine-detail transform, which in the example of FIG. 3 is also based on a Bidirectional Encoder Representations from Transformers (BERT) approach.

Under the BERT approach, when a query is received, the relevant sequences in the documents can be identified quickly (possibly from a set of objects that may have been earlier identified using, for example fast-search processing) by identifying a part of a document (e.g., a paragraph) that may contain the answer, and identifying the span of words in that part of the document that contains the specific answer. In some examples, under the BERT approach the question and the answer are concatenated (tokenized for example using WordPiece embeddings, with suitable markers separating the question and the answer) and processed together in a self-attention-based network. The output of the network indicates a score for each possible starting position for the answer and a score for each possible ending position for the answer, with the overall score for a span of the answer being the sum of the corresponding start and end positions of the answer. That is, a self-attention method is used where embedded vectors of a paragraph and a query are mixed together through many layers followed by a decision-maker layer and segmenter logic to provide an efficient method to determine if a question is answerable by a paragraph, and if so, determine where exactly the span of the answer lies in the paragraph.

In the BERT-based approach, a network may first be trained on a masked language model task in which a word is omitted from the input, and predicted by the network by an output layer that provides a probability distribution over words of the vocabulary. Having trained the network on the masked language model task, the output layer is removed, and in the case of the question answering task, a layer is added to yield the start, end, and confidence outputs, and the network is further trained (e.g., fine-tuned, transfer learning) on supervised training data for the target domain (e.g., using Stanford Question Answering Dataset, or SQUAD). Having trained the network for question answering for the target domain, further training may be used to adapt the network to a new domain. Another training strategy used for BERT is the next-sentence prediction, in which the learning engine is trained to determine which of two input segments (e.g., such segments may be neighboring sentences of a text-source) is the first of the two segments. When training the model, both the masked-language and next-sentence training procedures may be combined by using an optimization procedure that seeks to minimize a combined loss function. Alternatively, or additionally, other training strategies (to achieve context recognition/understanding) may be used separately, or in conjunction with, one of the aforementioned training strategies for BERT.

In example embodiments based on the BERT approach, an implementation, referred to as a Two-Leg BERT approach, may be used in which much of the processing of a query is separated from the processing of parts of a document (e.g., paragraphs) in which answers to the query may be found. Generally, in the two-leg-BERT approach, the neural network architecture has two "legs", with one leg for processing the query, and one for processing the paragraph, and the outputs of the two legs are sequences of embeddings/encodings of the words of the query and the words of the paragraph. These sequences are passed to a question-answering network. A particular way this approach is used is to precompute the BERT embedding sequences for paragraphs, and complete the question-answering computation when the query is available. Advantageously, because much of the processing of the paragraphs is performed before a query is received, a response to a query may be computed with less delay as compared to using a network in which the query and each paragraph are concatenated in turn and processed together. The paragraphs are generally much longer than the queries (e.g., 200-300 words versus 6-10 words) and therefore the pre-processing is particularly effective. When successive queries are applied against the same paragraph, the overall amount of computation may be reduced because the output of the paragraph leg may be reused for each query. The low latency and reduced total computation can also be advantageous in a server-based solution. As noted, in the implementations described herein, the BERT-based processing of the source documents produces transformed content that is typically stored in a repository (such as the DOM repository 140 of FIG. 1). The underlying documents from which the BERT-based transformed content is generated may be retained as well, and associated with the resultant transformed content (as well as associated with corresponding transformed content obtained via other transforms).

In some embodiments, the BERT-based transformers (e.g., used for the fast, coarse, transformation, and/or for the fine-detail transformation) may be implemented according to encoder-based configuration. For example, a BERT-based transformer structure may include multiple stacked encoder cells, with the input encoder cell receiving and processing the entirety of an input sequence (e.g., a sentence). By processing the entirety of an input sentence, a BERT-based implementation can process and learn contextual relations between individual portions (e.g., words in the input sequence). An encoder layer may be realized with a one or more self-attention heads (e.g., configured to determine relationships between different portions, e.g., words in a sentence, of the input data), followed by a feedforward network. The outputs of different layers in an encoder implementation may be directed to normalization layers to properly configured resultant output for further processing by subsequent layers.

It is to be noted that, in some embodiments, the fast-search vector transformation (transforming a segment into a compact-sized numerical vector) may be applied to a tokenized version of the text (e.g., some transformation, such as transformations achieved through the BERT process, may have already been performed to produce an intermediary (e.g., tokenized) content, to which the fast-search transform is then applied).

The transform modules (fast-search, BERT-based, or any other type of transform) may be implemented through neural networks that have been pre-trained to produce transformed content associated with question-answer pairs. Other transform implementations may be realized using filters and algorithmic transforms. Training of neural network implementations may be achieved with a large training samples of question-answer ground truths that may be publicly available, or may have been internally/privately developed by the customer using the system 100 to manage its document library.

In implementations based on neural networks, different types of neural network architectures, configuration, and/or implementation approaches may be used. Examples neural networks that may be used include convolutional neural network (CNN), feed-forward neural networks, recurrent neural networks (RNN), etc. Feed-forward networks include one or more layers of nodes ("neurons" or "learning elements") with connections to one or more portions of the input data. In a feedforward network, the connectivity of the inputs and layers of nodes is such that input data and intermediate data propagate in a forward direction towards the network's output. There are typically no feedback loops or cycles in the configuration/structure of the feed-forward network. Convolutional layers allow a network to efficiently learn features by applying the same learned transformation(s) to subsections of the data.

The neural networks (and other network configurations and implementations for realizing the various procedures and operations described herein) can be implemented on any computing platform, including computing platforms that include one or more microprocessors, microcontrollers, and/or digital signal processors that provide processing functionality, as well as other computation and control functionality. The computing platform can include one or more CPU's, one or more graphics processing units (GPU's, such as NVIDIA GPU's, which can be programmed according to, for example, a CUDA C platform), and may also include special purpose logic circuitry, e.g., an FPGA (field programmable gate array), an ASIC (application-specific integrated circuit), a DSP processor, an accelerated processing unit (APU), an application processor, customized dedicated circuitry, etc., to implement, at least in part, the processes and functionality for the neural network, processes, and methods described herein. The computing platforms used to implement the neural networks typically also include memory for storing data and software instructions for executing programmed functionality within the device. Generally speaking, a computer accessible storage medium may include any non-transitory storage media accessible by a computer during use to provide instructions and/or data to the computer. For example, a computer accessible storage medium may include storage media such as magnetic or optical disks and semiconductor (solid-state) memories, DRAM, SRAM, etc.

The various learning processes implemented through use of the neural networks described herein may be configured or programmed using TensorFlow (an open-source software library used for machine learning applications such as neural networks). Other programming platforms that can be employed include keras (an open-source neural network library) building blocks, NumPy (an open-source programming library useful for realizing modules to process arrays) building blocks, etc.

Figure 4:
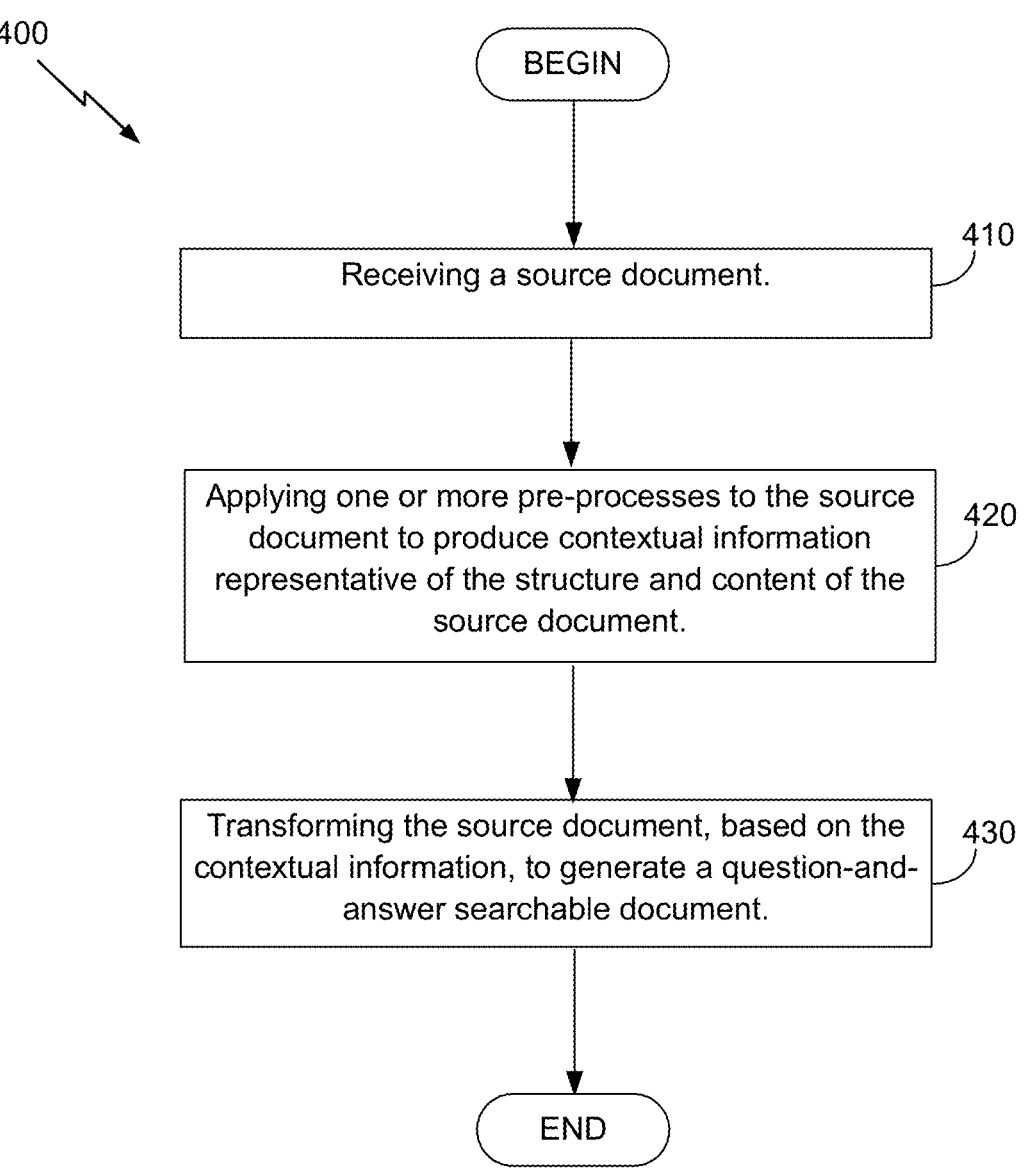
FIG. 4 is a flowchart of a procedure for document processing (ingestion).

With reference next to FIG. 4, a flowchart of a procedure 400 for document processing (ingestion) is shown. The procedure 400 includes receiving 410 a source document, and applying 420 one or more pre-processes to the source document to produce contextual information representative of the structure and content of the source document. The document may be received at a remote document processing agent via an interface, such as the server interface 120 of the system 100, accessed from a customer library of documents (e.g., according to links or transmissions provided by an authorized administrator of the customer network), and/or from other sources of data (the customer's e-mail server(s), chat server(s), special application server(s), etc.)

In some embodiments, applying the one or more pre-processes may include segmenting the source document into a plurality of document segments. Segmenting the source document may include segmenting the source document into the plurality of document segments according to hierarchical rules semantically associating one portion of the source document with one or more other portions of the source content. In such embodiments, segmenting the source document according to hierarchical rules may include combining (including), in a particular document segment, content of a particular document portion and section heading content located in the source document ahead of a location of the particular document portion, with the section heading content being determined to be associated with the content of the particular document portion.

In some examples, applying the one or more pre-processes to the source document may include identifying a portion of the source document comprising multiple sub-portions arranged in a multi-cell table, and generating multiple substitute portions to replace the multi-cell table, with each of the multiple substitute portions comprising a respective sub-portion content data and contextual information associated with the multi-cell table. In some other examples, applying the one or more pre-processes to the source document may include associating contextual information with one or more portions of the source document based on information provided by a user in response to one or more questions relating to the source document that are presented to the user. Additionally or alternatively, applying the one or more pre-processes to the source document may include associating question-and-answer contextual information relating to a particular portion of the source document based on one or more ground truth samples of question-and-answer pairs.

Applying the one or more pre-processes to the source document may also include determining relative importance value for a particular portion of the source document based on one or more of, for example, location of the particular portion relative to locations of one or more other portions of the source document, relative font size of the particular portion, structure and organization of the source document, document type (PDF vs. Word documents) of the source document, etc.

As noted, in some variations, pre-processing can include the determination of important contextual information (e.g., entity, task, subject matter) that can be used to tag segments, and, subsequently, upon submission of a query, to eliminate from searching those searchable document segments whose tags are inconsistent or contradictory to the tags/descriptors associated with the query data. That is, query data is processed to derive contextual data in the form of tags or descriptors (e.g., using rules, heuristics, classification engines (that may be based on learning engine implementations), and those tags/descriptors may be matched up to document segments (e.g., in transformed form) that have matching/consistent tags/descriptors. Thus, in such variations, applying the one or more pre-processes may include segmenting the source document into a plurality of document segments. In these examples, the procedure 400 may further include for at least one segment of the plurality of document segments, determining at least one segment descriptor comprising one or more of, for example, at least one entity associated with the at least one segment, at least one task associated with at least one segment, and/or subject matter descriptor associated with at least one segment, and tagging the at least one segment with the at least one descriptor. The procedure may also include receiving, at the local device, query data representative of a question relating to source content of the source document, determining at least one query descriptor associated with the query data, the at least one query descriptor comprising one or more of, for example, at least one entity associated with the at query data, at least one task associated with the query data, and/or subject matter descriptor associated with the query, and searching a response to the query data from one or more of the plurality of document segments with segment descriptors matching the at least one query descriptor. As noted, searchable segments with tags that are inconsistent with the query tags/descriptors may be excluded/eliminated from the searching process. In another example, the method may further include receiving, at the local device, query data representative of a question from a user relating to the content of the source document, determining contextual information based on sensor data obtained by a sensor device associated with the user, and searching a response to the query data from one or more of the plurality of document segments with segment descriptors matching the determined contextual information. In such embodiments, determining the contextual information may include determining an item or location identifiable (e.g., using a learning machine configured to detect and identify objects appearing in an image) from image data captured by a camera device used by the user, and searching the response to the query data may include searching the response to the query data from one or more of the plurality of document segments based, at least in part, on the determined item or location identifiable from the image data. It will be appreciated that contextual information can also be obtained from other sensor devices associated with the user, including audio sensors, wireless communication sensors (e.g., wireless transceivers, satellite positioning receivers, etc.) that are included with a mobile device used by the user submitting the query. As noted, in some examples, the sensors devices may be part of an augmented reality system that includes a streaming image-capture sensor. It is to be noted that the determination of contextual information to facilitate the searching executed in response to a received query can be performed not only with respect to the procedure 400, but also with respect to any of the other procedures and methods of the present disclosure.

With continued reference to FIG. 4, the procedure 400 further includes transforming 430 the source document, based on the contextual information, to generate a question-and-answer searchable document. In some examples, transforming the source document may include transforming each of the plurality of document segments into one or more respective transformed segments according to one or more transformations. The one or more transformations may include one or more of, for example, a coarse linearization transform (compact-sized transform), which may be based on a BERT-approach, to generate a plurality of numerical vectors representative of content of the plurality of document segments (e.g., the fast-search transform), or a detailed-search transformation (e.g., BERT-based transformation, which optionally may be a two-leg-BERT transformation) to generate high resolution transformed content records representative of the content of the plurality of document segments. The coarse transform may transform a document segment into a single (fixed-size or variable-size) vector to represent the segment, while the detailed-search transformation may produce multiple vectors representative of the document segment. Thus, the one or more transformations may include one or more of, for example, a coarse linearization transform to generate coarse numerical vectors representative of coarse content of the plurality of document segments, or a fine-detail transformation to generate fine-detail transformed content records representative of the content of the plurality of document segments. Transforming the source document may include transforming the source document based, at least in part, on the determined relative importance value for the particular portion, and on relative importance values for other portions of the source document.

Question Answering Using a Cache

As described herein, to reduce search time, improve accuracy, and be able to override bad answers that may have been obtained through searching of the transformed content on the DOM repository, an input cache, such as the cache 135 schematically depicted in FIG. 1, may be used. A cache, such as the cache 135, is configured to store answers/contents corresponding to the frequently asked questions. Such answers/contents may include content previously retrieved from the DOM documents (and/or from their corresponding raw source content) in response to previously submitted queries. Counters associated with such cached answers can track the frequency at which specific questions and answers have been submitted and/or retrieved. The cache may also be configured to discard cached content that has not been requested within some reference (threshold) time interval. The cache also allows refinement (curation) of content obtained from the cache or from the DOM repository based on replacement content provided by users (such as designated subject matter experts of the entity/organization whose library of documents is being managed by the document processing, searching, and response generation agent.

As noted, in some embodiments, a customer network (such as the customer network 150a of FIG. 1) may provide source data for ingestion and storage (i.e., so as to preserve institutional/tribal knowledge) not only from existing documents, but also from different applications (such as an e-mail application, a messaging application, a chat application, various collaborative frameworks, etc.) on which knowledge may be dynamically generated and passed. Such knowledge can be ingested and preserved in a global repository such as the DOM repository 140, with ingested objects associated with information (e.g., metadata) identifying the application from which the source content originated. As with question-and-answer records/objects corresponding to source content from a library of documents (such as the library 160 of FIG. 1) that are, under certain circumstances, stored in a Question-and-Answer cache structure or device, in some embodiments, some of the data generated from other applications supported by the customer network may be stored in a cache structure in order to avoid having to launch a full-blown search in response to a submitted query. In such embodiments, a cache (such as the cache 135 of FIG. 1) can first be checked to see if a similar question (and/or its corresponding answer) may already be stored in the cache, e.g., because the query is a frequently asked question, or because the query is associated with a response that was characterized or designated as being more accurate than what would otherwise be retrieved from the DOM repository, or characterized as being an important or valuable item of information. For example, queries involving questions having a high information value, such as "how to . . . " questions posed by the user (inquiring about functionality of a particular application), may be determined to warrant storage in the cache associated with the particular application. This allows for the codification of fluid institutional information that may not be otherwise documented, but which corresponds to intangible know-how available from one or more experienced users (or experts). Furthermore, organizing codified institutional knowledge into specific caches in itself constitutes part of the capture of intangible know-how (i.e., because the classification itself is a form of metadata or contextual information that is being preserved).

Figure 7:
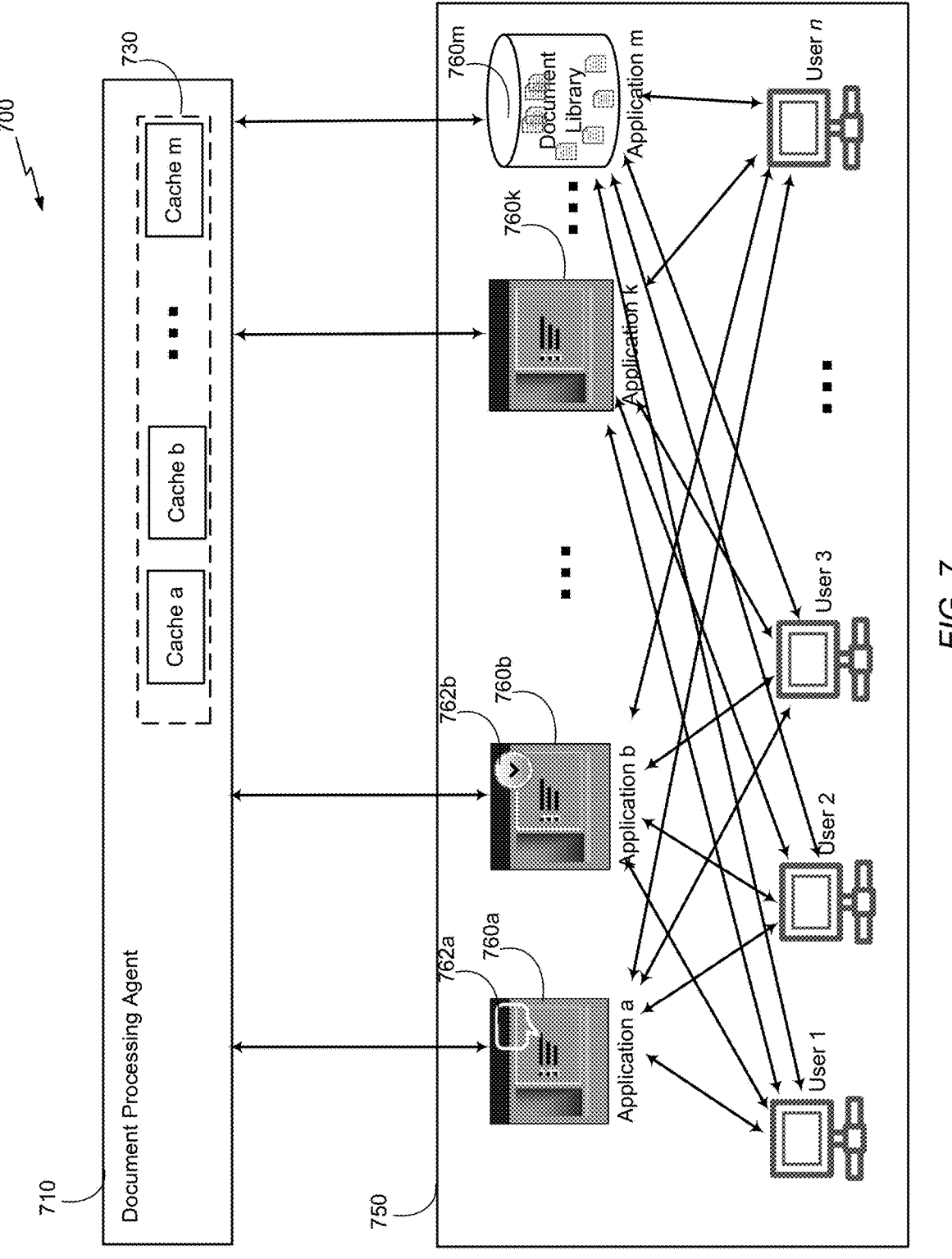
FIG. 7 is a schematic diagram of an example system in which a customer network executes multiple applications producing user data provided for document processing. Like reference symbols in the various drawings indicate like elements.

To facilitate access to knowledge specific to respective applications operated by the customer, widgets (e.g., implemented based, for example, on Java programming language, to cause the invocation of a query process or window) may be implemented to provide query interfaces through which users can enter questions (e.g., "how to" questions) pertaining to that specific application (this is referred to as "in-application searches"). For example, consider FIG. 7, which is a schematic diagram of an example system 700 (which may form part of the system 100 depicted in FIG. 1), in which a customer network 750 (which may be similar to the customer network 150*a*) executes m applications, e.g., an e-mail server, a Slack application, or any other type of application that produces user data (through user-to-user interaction, or through any user-machine interaction) that may be of sufficient value to preserve for future use. In the system 700, the application 760*b* is shown as having a user interface that includes a widget (represented as the chevron button 762*b*) that allows the user, when the widget is selected, to open a window (e.g., cause a drop-down window or menu to appear) or to activate an input entry area in the interface where the user can type in the query. Alternatively, in some embodiments, queries can be provided into the common interface for the application, but may be prefaced in such a way that the application recognizes the data entered as a trigger to launch a Q-A search (of a depository such as the DOM depository 140, or of one or more of the Q-A caches of the document processing agent). An example of a way to preface a query so that an application (such as Slack, or some other interactive or collaborative application) recognizes it as a query directed to the document processing agent (or procedures) rather than as a communication to another user(s), is by inputting an expression such as "Hey Pryon" (or some other pre-determined expression). In FIG. 7, application 760*a* is depicted as a chat-based application, such as Slack, that includes a chat interface 762*a* through which a user could submit input that would be recognized by the application a request to launch a query.

To further improve on the efficiency and accuracy of determining responses to queries, each customer network application/platform that constitutes a separate source of data to be ingested may be associated with a separate, dedicated, cache structure to store data that originated from that application (for each such cache, the criteria for cache storage may be similar to those discussed with respect to the cache 135, namely, based on frequency at which questions and retrieved responses are sought, based on whether particular responses have been flagged as satisfactory, based on whether expert users have compiled responses to specific questions, etc.) Although different applications may be associated with dedicated caches, it will be appreciated that the cache can be consolidated at a physical location(s) that is logically partitioned to serve specific applications, or that a single cache (whether at a single physical location or at multiple distributed locations) can be associated (e.g., using an identifier, flag, or record field) with one or more of the multiple applications used by the customer network. Thus, if the customer network 150*a* uses the Slack application (or any other chat, information sharing, or collaborative application), data generated via that application may be processed and preserved at the DOM repository 140, with at least some of the information stored at a dedicated cache for that application, or at a cache section (of a global cache, such as the cache 135 of FIG. 1) dedicated to store question-and-answer records/objects from the Slack application.

A user may be authorized to access and use one or more of the various applications available to users of the customer network 750 (some of the applications may be running on local servers, while one or more of the applications may be cloud-based applications). Some or all of the data generated, or otherwise provided to the applications a-m may be forwarded (e.g., as may be facilitated by network administrators) to a document processing agent 710, which may be similar in configuration and/or implementation to the agent 110 of FIG. 1. Although the agent 710 is shown as implemented at a different logical block than the customer network 750, as noted, at least part of (and in some examples, all of) the agent 710 may be implemented at the servers constituting the customer network 750. The agent 710 includes various interfaces (not specifically illustrated in FIG. 7, but similar to the interfaces 120, 125, 130, and 132 of FIG. 1) to realize communication between the various nodes of the customer network 750 (and, where the agent 710 is a centralized system, to nodes in multiple other customer networks), and further includes modules such as an ingestion engine (not shown in FIG. 7, but similar to the ingestion engine 126 of FIG. 1), a query processing module (not specifically shown in FIG. 7, but similar to the module 136 of FIG. 1), and a cache 730 (which may be similar to the cache 135 of FIG. 1). As illustrated in FIG. 7, the cache 730 may include dedicated cache devices for each of the applications 760*a-m* operated by the customer network 750. Those caches may be located in a single physical location (e.g., at a server realizing the agent 710) or at the servers on which the applications 760*a-m* are running. As noted, the applications 760*a-m* may include a document library (marked as library 760*m*, which may be similar to the library 160 of FIG. 1) accessible by one or more of the users of the customer network 750, an e-mail application, a chat application, etc. In situations where content generated via the various applications 760*a-m* is determined to requiring storing (e.g., through question-and-answer processing, which may be implemented through the ingestion processes described herein), some of that content may be stored in the question-and-answer caches associated with the respective applications 760*a-m*. For example, if content generated through application 760*a* is frequently retrieved (e.g., in response to subsequent queries generated by users of the application 760*a*), a question-and-answer entry for that content (e.g., a question-answer pair) may be stored in 'cache a' corresponding to the application 760*a*. Upon subsequent queries, the query data may be processed to check if a question-answer entry in the cache matches the query data, and if so, the answer portion for the stored cache entry may be provided as a response to the query without needing to search a data repository such as the DOM repository 140 of FIG. 1.

With reference next to FIG. 5, a flowchart of an example procedure 500 for content management and question answering using an input cache is shown. The procedure 500 includes receiving 510, at a local device (e.g., the document processing agent 110 of FIG. 1) from a remote device (e.g., one of the terminal stations in the customer network 150*a*) query data representative of a question relating to source content of a source document. The procedure 500 further includes determining 520 whether one or more pre-determined questions stored in a question-answer cache (e.g., the cache 135) maintained at the local device matches the query data according to one or more matching criteria. As noted, in embodiments in which the cache stored Q-A pairings (namely, a question and its associated answer) the matching of query data to the past questions and associated answers stored in cache is performed by computing a score that is based on the combination of the questions and their answers, and ranking the computed scores to identify one or more likely matching candidates.

The search of the question-answer cache (also referred to as a "question store) may be based on meaning representation and using question similarity (paraphrase) processing. Thus, in some examples, determining whether the one or more pre-determined questions stored in a question-answer cache maintained at the local device matches the query data according to one or more matching criteria may include determining linguistic meaning of the query data, determining a level of meaning similarity between the query data and respective meaning of at least some of the pre-determined questions in the question-answer cache, and determining that at least one of the one or more pre-determined questions is a match to the query data when the level of meaning similarity between the query data and the respective meaning for the at least one of the one or more pre-determined questions exceeds a pre-determined similarity threshold. In some embodiments, matching the query data to cache data could also be implemented through exact OR operation based on a process similar the BERT-based model. In such embodiments, a vector of the query is matched to a combination of vectors of the frequently asked question and the vectors of the answers that have previously been found. Thus, in such embodiments, a new query may be matched to existing old questions in the cache (which as noted, may be a global cache to store Q-A pairs from all content sources of an entity, or dedicated caches associated with individual content sources generated using different applications) and/ or to existing answers. The matching process includes determining the closeness or similarity of the current query data to questions, to answers, and/or to question-answer pairs. Matching of a new question (corresponding to the current query) to existing questions can be dealt with as a paraphrasing problem, whereas matching of the new question to an old answer can be thought of as reading-comprehension matching problem. A combination of the two matching steps (the matching of the new question to existing questions, and of the new question to existing answers) can thus lead to improved performance.

With continued reference to FIG. 5, the procedure 500 additionally includes obtaining 530 from the question-answer cache, in response to a determination that at least one of the pre-determined questions matches the query data received from the remote device, at least one answer data item, associated with at least one pre-determined question, corresponding to an answer to the question relating to the source content. In some examples, obtaining from the question-answer cache at least one answer data item may include obtaining at least a pointer to access, from a copy of the source document accessible from the remote device, at least one portion of the copy of the source document corresponding to the answer to the question relating to the source content. Obtaining from the question-answer cache at least one answer data item may include obtaining one or more of, for example, at least part of the source content, and/or a summary of the at least one portion of the source content.

User feedback to the query results delivered to a user (responsive to a query submitted by that user) may be used to cache a Q-A pair that the user has indicated to be a good answer to the query he/she has submitted. Thus, the procedure 500 may further include storing in the question-answer cache a data item representative of a pair of a particular question and a corresponding answer in response to receiving an indication, from a user, that a portion of the data item representative of the corresponding answer represents a satisfactory response to the particular question.

In some examples, when a determination is made that an answer delivered in response to a query (e.g., whether the answer was obtained as a result of searching the cache 135 or the DOM repository 140) is incorrect or unsatisfactory (i.e., it is a "bad" answer), a correct answer can be provided (e.g., by a user of the customer network) and stored in the cache to override the incorrect answer. Thus, the procedure 500 may further include obtaining, at the local device, replacement answer data to replace an initial answer data determined at the local device in response to a particular question, with the initial answer determined by a user to be an unsatisfactory response to the particular question, and storing in the question-answer cache a data item representative of a pairing of the particular question and the replacement answer.

In some embodiments, the main document storage (e.g., the DOM repository 140 of FIG. 1) may be searched when there is no match between the submitted query and questions in the question-answer cache. Thus, the procedure 500 may further include searching, in response to a determination that none of the pre-determined questions stored in the question-answer cache matches the query data received from the remote device, a documents storage at the local device, with the document storage comprising a plurality of document objects of transformed content corresponding to one or more source documents, to identify one or more of the plurality of document objects according to the query data. In such embodiments, in response to a determination, at the local device, of a match between the query data and at least one portion of the transformed content, the procedure may further include generating output data based on the at least one portion of the transformed content. The output data may include at least a pointer to access, in a copy of the source document accessible from the remote device, at least one portion of the copy of the source document corresponding to the at least one portion of the transformed content. The procedure may also include storing the plurality of document objects at the document storage, including receiving one or more source documents at the local device, segmenting the one or more source documents into a plurality of document segments, transforming each of the plurality of document segments into one or more respective transformed segments according to one or more transformations, and arranging the transformed segments into the plurality of document objects.

Implementations described herein are also configured to generate follow-up questions recommendations (e.g., by the query processing module 136 or the user query interface 130 illustrated in FIG. 1), and provide output data responsive to at least one of the follow-up questions. For example, the procedure 500 may further include identifying, based on the received query data representative of the question, one or more additional questions from a repository of query data representative of a plurality of questions associated with source documents, and generating additional output data comprising additional answer data responsive to at least one of the identified one or more additional questions. This feature may be used, for example, in circumstances where a user, receiving the response to the originally submitted query, considers that response to be useful and may be desiring additional information on the subject. Such additional information can thus be generated by proposing follow-up questions that are related in some sense to the originally submitted query. In some embodiments, the additional questions may be generated from user and administrators feedback, and/or from questions associated with the responses determined for the query submitted by the user. Thus, the procedure may further include obtaining the one or more additional questions based on one or more of, for example, input data received from one or more users of the local device and/or the remote device, and/or metadata associated with identified responses to the query data determined from document objects (stored at the local device) associated with the source document. In such embodiments, the procedure may further include storing in the repository of query data one or more additional question data items representative of the one or more additional questions.

In some embodiments, the systems described herein may generate additional recommended question as part of a question-augmentation procedure. In such embodiments, for a QA system (such as the system 100 of FIG. 1) that a particular company deploys, there might be acronyms, multiple words that are synonyms of each other, or new words that show up that could be the synonym of existing words. A synonym file, administered, for example, by the administrator station 152 for the particular company, can be used to construct new questions (e.g., semantically similar or identical), and have the new questions (e.g., with synonyms identified from the synonym file to be substituted for some of the words in the original question) submitted. The new question(s) are processes by the document processing agent (e.g., by searching the DOM repository 140 of FIG. 1, in the manner described herein) and output responsive to the new queries (corresponding to the augmented questions) is provided to the querying user (or to some other user, e.g., an administrator or an expert user whose role is to curate generated response). In some embodiments, the responses to the augmented questions may be identified with associated confidence levels, and the highest ranking answers/responses (e.g., the top n responses with the highest confidence levels, as determined by the query processing module operating in conjunction with the DOM repository 140, with n=1, 2, 3, . . . , or any other non-zero integer value) are presented as the output to the augmented questions query(ies). The user receiving the output can then select the response the user deems to be the most appropriate or satisfactory (that response may, but does not have to be, the response with the highest computed confidence level). In some implementations, the synonyms to replace the wording of the original query may be for one word, for multiple words, or may correspond to a change of order of a couple of words in the question. Substitution of synonyms in the original query may be based on different synonym/substitution rules to modify the originally submitted question to create and augmented question. The number of augmented questions could be 0, 1, 2, or any other number, as may be adjusted or configured according to the desired computational resources that are to be dedicated to this functionality or task.

Thus, in embodiments relating to generation of augmented questions, the procedure 500 may further include generating one or more augmented questions based on the question corresponding to the query data. Generating the one or more augmented questions may include revising the question in the query data based on one or more of, for example, a) changing order of wording in the question corresponding to the query data, and/or b) substituting one or more words in the question with substitute words identified from a synonym data record (e.g., synonym file) based on a determination that the substitute words are synonyms or equivalent words to the one or more words in the question. The procedure may further include searching at the local device a documents storage, comprising a plurality of document objects of transformed content corresponding to one or more source documents, to identify one or more of the plurality of document objects according to the one or more augmented questions.

Implementations described herein are additionally configured to determine if a received query is a command (rather than a question). Thus, in such implementations, the procedure 500 may further include determining that the query data matches one of pre-determined commands associated with respective processes performed, at the local device, with respect to the source document, and executing the pre-determined process associated with the one of the pre-determined commands determined to match the query data. In some examples, determining that the query data matches one of pre-determined commands may include determining that the query data matches a summary command configured to cause generation of a summary of at least a portion of the source document.

Data Curation

The implementations described herein may also be used to curate data. Particularly, a question-and-answer (Q-A) data item (e.g., a response to a query submitted by a user) is selected (e.g., based on metadata) and is sent to one of several experts for data curation (refinement) of the Q-A data item. The expert can be selected based on information about the available experts by, for example, matching subject matter of the Q-A data item to the right expert, and/or based on other criteria. The expert edits the item, adding some additional data (to capture institutionalized/tribal knowledge), and sends the refined answer back to archiving (e.g., in a knowledge cache, which may be part of the cache 135 of FIG. 1, or for storage in the repository 140). The data curation framework may also integrate a reward system as a way of increasing participation from expert users (thus expanding the roster of available expert uses, and providing the system with more options and criteria for expert selection).

The metadata used to determine whether to send a Q-A item to an expert for curation may include history information representative of historical information about formation and subsequent access of the Q-A item. Examples of such history information include frequency at which Q-A item has been accessed by users, feedback from users indicating whether an answer is good or bad, confidence level of responsiveness of an answer to a question, authorship of the source document from which the Q-A data item has been mined, etc. The confidence level of responsiveness (one of the types of history information based on which the determination is made of whether to send a data item to an expert for refinement) can be based on a ranking of search results performed on ingested documents, e.g., confidence level will depend on how many "hits" were generated, and how close is a question associated with an identified document portion to an original query submitted by a user. The historical information for a Q-A data item can be compared to respective threshold values to decide whether or not to send the Q-A data item to a selected expert. If, for example, the confidence level associated with the highest ranked answer is below some pre-determined threshold, a rule-based mechanism implemented by the query module nay determine that the query (and, optionally, one or more of the responses identified by running the query on the DOM repository) needs to be directed for further review by an expert (e.g., an experienced user). A different example of a rule or process to handle search results may include considering the confidence level associated with the top three (3), or any other number of top-ranked answers, and determining that a query needs to be sent to an expert when all those top-ranked answers are below some pre-determined threshold (which may be the same, or different, than the threshold used to evaluate just the top-ranked answer). Yet another example of a rule to handle search results may be to use a combination of a confidence level and feedback by a user (e.g., the confidence level of response(s) provided to a user is/are below a third pre-determined threshold, and the user indicates the responses provided are unsatisfactory). Conversely, in this example, if a user indicated the response(s) to be acceptable, no further curation would be required even if the confidence level for the response is below the third pre-determined threshold. Other rules or processes for handling the search results (e.g., based on the historical information) may be used. The rules and processes may be performed according to some order or rule hierarchy implemented to handle responses (e.g., multiple rules may be applied in a certain order to a given set of query responses, until conditions imposed by one or more of the rules or processes are satisfied).

When an expert returns a curated (refined) Q-A data item, the curated Q-A data item is cached (e.g., stored in the cache 135). The curated data item is communicated to the agent 110 via the user query interface 130, or via a dedicated expert interface 132, which may be implemented similarly to any of the other interfaces of the system 100, but may only be accessed by the selected expert (e.g., an expert at the station 154*b* of FIG. 1, which established a link 176 to the expert interface 132) and the administrator at the station 152.

If on a subsequent query the query data matches the question portion of a curated Q-A item stored in the cache, the answer portion of the curated Q-A item is used to generate output data deliverable to the user that submitted the query. If, however, on the subsequent query the query data does not match any of the question portions of the Q-A data items in cache (whether those items were curated or stored as a result of some of the other processes described herein), the query data is used to perform a regular search of the DOM repository to obtain a possible response to the query. As noted, in some embodiments, the matching of query data to cache items may be implemented based on a matching procedure that matches the query to the question in the cache, and to the answer items in the cache (e.g., based on a BERT-based process).

Thus, with reference to FIG. 6, a flowchart of an example procedure 600 for data curation is shown. The procedure 600 includes obtaining 610 at a local device (e.g., the document processing agent 110 of FIG. 1), a question-and-answer data item representative of a question-and-answer pair relating to source content of a source document. The question-and-answer data item is associated with question-and-answer history information representative of historical information and access information for the question-and-answer data item. The procedure 600 further includes determining 620 based on the question-and-answer history information whether to perform data refinement operations on the question-and-answer data item.

The question-and-answer history information (which may be part of the metadata associated with the Q-A data item) may include one or more of, for example, frequency at which the associated question-and-answer data item has been accessed, level of satisfaction determined based on feedback by one or more users regarding the question-and-answer data item, a confidence level of responsiveness of an answer portion to a question portion of the question-and-answer data item, and/or authorship information associated with the question-and-answer data item.

In some examples, the procedure may additionally include deriving the confidence level of the responsiveness of the answer portion to the question portion according to search results obtained from searching a plurality of document objects of transformed content corresponding to one or more source documents, to identify one or more of the plurality of document objects according to question data representative of the question portion of the question-and-answer data item. In such examples, the confidence level is based on what was found using a search of the DOM repository. Thus, deriving the confidence level may include deriving the confidence level of the responsiveness of the answer portion to the question portion based on a number of the identified one or more plurality of document objects, and on closeness level of the question data to respective question portions associated with the identified one or more of the plurality of document objects. In some embodiments, determining based on the question-and-answer history information whether to perform refinement operations on the question-and-answer data item may include determining whether to refine the question-and-answer data item based on one or more of, for example, i) the frequency at which the associated question-and-answer data item has been accessed exceeding a frequency threshold, ii) the level of satisfaction determined based on the feedback by the one or more users regarding the question-and-answer data item being below a satisfaction threshold, iii) the confidence level of the responsiveness of the answer portion to the question portion exceeding a responsiveness threshold, and/or iv) the authorship information matching one or more pre-identified names.

With continued reference to FIG. 6, the procedure 600 also includes selecting 630, in response to a determination that the question-and-answer data item is to be refined, one of a plurality of users (experts) according to one or more matching criteria relating, at least in part, to subject-matter associated with the question-and-answer data item and expertise information respectively associated with the plurality of users, and communicating 640 at least the questionand-answer data item to a destination device (e.g., the device 154*b* in the example of FIG. 1) associated with the selected one of the plurality of users.

The Question-and-answer data item may include one or more of, for example, a pointer to access from a remote device at least a portion of the source document corresponding to an answer to the question-and-answer pair, at least part of the source content, and/or a summary of the at least the portion of the source content. In some embodiments, the procedure may include storing a refined (curated) question-and-answer pair in a question-answer cache at the data processing agent. Thus, the procedure 600 may further include receiving, at the local device, a refined question-and-answer data item derived from the question-and-answer data item communicated to the destination device, and storing the refined question-and-answer data item at a question-answer cache maintained at the local device.

On subsequent queries that match a question element for a curated question-and-answer pair stored in the cache, the curated answer element stored in cache for the curated question-and-answer pair is sent back to the querying user. Thus, the procedure may further include receiving, at the local device, from a remote device (e.g., the station 154*a* where a regular user is submitting a query) query data representative of a subsequent question relating to the source content of the source document, determining whether the query data matches a question portion of the refined question-and-answer data item, stored in the question-answer cache, according to one or more matching criteria. In response to a determination that the question portion of the refined question-and-answer data item matches the query data received from the remote device, obtaining from the question-answer cache at least one answer portion of the refined question-and-answer data item, and transmitting the at least one answer portion to the remote device.

On the other hand, if the query data submitted does not match any question element in the cache, the query is submitted as a search request to the document repository (e.g., the DOM repository 140 of the system 100 in FIG. 1). Thus, in such embodiments, the procedure may further include searching at the local device (i.e., at the agent 110 of FIG. 1), in response to a determination that the query data does not match the question portion of the refined question-and-answer data item stored at the question-and-answer cache, a documents storage, comprising a plurality of document objects of transformed content corresponding to one or more source documents, to identify one or more of the plurality of document objects according to the query data. In response to determination, at the local device, of a match between the query data and at least one portion of the transformed content, generating output data based on the matched at least one portion of the transformed content. As previously noted, the content in the DOM repository may be generated by storing the plurality of document objects at the document storage, including receiving one or more source documents at the local device, segmenting the one or more source documents into a plurality of document segments, transforming each of the plurality of document segments into one or more respective transformed segments according to one or more transformations, and arranging the transformed segments into the plurality of document objects.

Additional Embodiments

Additional embodiments of the implementations described herein may include some of the following features.

The document processing agent 110 may be configured to implement document library maintenance, cleanup, and administration features. For example, the agent 110 may be configured to detect inconsistent and duplicate answers/documents. During use (e.g., with admin reviewing suspect answers from logs), the system may be configured to allow either the admin or the user to remove the error documents. In some examples, the agent 110 may implement a detection feature that can issue warnings admin if a pair of paragraphs stored in the document library in different documents are too close or identical (e.g., in terms of their content), etc.

Thus, in some embodiments, a method is provided that includes applying question-and-answer processing on multiple source documents from one or more document libraries to generate respective resultant document records, determining level of similarity between a first one and a second one of the resultant document records, and managing the one or more document libraries based on the determined level of similarity between the first one and the second one of the resultant document records.

Example embodiments include one or more of the following features. Managing the one or more document libraries may include determining, based on the determined level of similarity, that the first one and the second one of the resultant document records are inconsistent with each other, or are substantial duplicates of each other. The managing may further include removing from the one or more document libraries one of a first source document corresponding to the first one of the resultant document records, or a second source document corresponding to the second one of the resultant document records, in response to a determination that the first one and the second one of the resultant document records are either inconsistent or substantial duplicates of each other.

Determining the level of similarity between the first one and the second one of the resultant document records may include determining the level of similarity based on user input responsive to output data, generated from the question-and-answer processing, provided to the user. Determining the level of similarity between the first one and the second one of the resultant document records may include determining the level of similarity, during document ingestion to create questions-and-answer objects, based on one or more of, for example, one or more hypothetical library questions applied to the multiple source documents, or determining a question from the first one of the resultant document records and using the determined question to evaluate content of the second one of the resultant document records. The method may further include providing output indicating similarity between a first source document, corresponding to the first one of the resultant document records, and a second source document, corresponding to the second one of the resultant document records, in response to a determination that the level of similarity between the first one and the second one of the resultant document records exceeds a similarity threshold.

Another set of features that may be included with the document processing implementations described herein relate to conversational reading. For this set of features, a document (e.g., article) may be downloaded with pointers to related content. The related content can be ingested to augment it for question answering (e.g., references on a Wiki page). The library of documents can be enhanced to include the related content for question answering dynamic extension document content (also known as conversational reading).

In some implementations, related complementary content (to expand on the original) may be obtained by: (a) using URL's in the original document to retrieve the content of those URL's into the knowledgebase, and/or (b) perform an entity and co-reference (CoRef) resolution (a natural language processing procedure for identifying expressions and terms that may refer to a particular name or term in the original content source) performed on the source document to find a set of important entities, and to run search tasks to find documents in large repositories (the entire Internet, private networks containing data repositories, etc.) that are relevant to the original document. Documents identified based on the CoRef resolution process are thus used to expand the knowledge base for the Q-A systems described herein.

In addition, as noted above with respect to the pre-processing functionality of the ingestion engine (e.g., the ingestion engine 126 of FIG. 1), content augmentation may also include discovery (e.g., through inferential processing) of entities, and other contextual descriptors, in a document and in other similar documents, in order to infuse the content of searchable segments of the source document with additional valuable information. This discovery of contextual information can be used to help speed up and improve the accuracy of the searching functionality. Determining augmented data (be it contextual data or actual data) may include the following operations:

Each search unit (e.g., 200-word windows, paragraphs, documents, etc.) is analyzed with respect to the inherent entities associated with the search unit, and also analyzed with respect to metadata entities of a task (e.g., HR, author, organization etc.)

Each search unit is tagged with the appropriate descriptors identifying inherent and metadata entities.

During the search, different heuristics can be used which could eliminate many of these search units by identifying them as irrelevant to the query at hand. For example, in one use case, where the user's question is determined with a high degree of confidence to relate to some specific subject matter (e.g., because the user explicit identification of the subject matter, e.g., the user specifically stating "I have a financial question," or because the subject matter can be inferred, through rules or classification engines, to pertain to the particular subject matter), all documents/document objects for other subject matters (HR, security, etc.) can be eliminated from further consideration, and those documents do not need to be searched in response to the submitted query.

The by-product of such filtering is to speed up both the fast-match and detailed match searching. Additionally, potential answer units from irrelevant categories do not create mis-recognition errors, and consequently this helps to improve the accuracy of searches.

Thus, in some embodiments, the procedure may further include, for at least one segment of the plurality of document segments, identifying at least one segment descriptor comprising one or more of, for example, at least one entity associated with the at least one segment, at least one task associated with at least one segment, and/or subject matter descriptor associated with at least one segment, and tagging the at least one segment with the at least one descriptor. In such example, the procedure may additionally include receiving, at the local device, query data representative of a question relating to source content of the source document, determining at least one query descriptor associated with the query data, the at least one descriptor comprising one or more of, for example, at least one entity associated with the at query data, at least one task associated with the query data, and/or subject matter descriptor associated with the query, and searching a response to the query data from one or more of the plurality of document segments with segment descriptors matching the at least one query descriptor.

Certain implementation can perform analysis of the related documents, and use the results from the related documents to generate appropriate supplemental searches for the main documents managed by the system 100. The agent 110 may also be configured to summarize the related documents accessed, for example, when the content in the related documents is too voluminous to view completely, and users do not know what questions to ask in relation to the related documents. Under those circumstances, a summary of the related documents can be used to suggests what information can be asked. This summary can also be used for automatic identification of question-answer pairs from the content of the related documents.

Thus, in some embodiments, a method is provided that includes receiving at a local device a source document, retrieving augmented data associated with the received source document, and transforming the source document combined with the retrieved augmented data to generate a question-and-answer searchable document.

Embodiments of the method may include one or more of the following features. Retrieving the augmented data may include one or more of, for example, retrieving the augmented data based on links included in the source document, and/or or performing co-reference resolution to determine one or more names or expressions identified in the source document, and searching information repositories to retrieve additional information associated with the determined one or more names or expressions identified in the source document.

Transforming the source document combined with the retrieved augmented data to generate the question-and-answer searchable document may include segmenting the source document combined with the retrieved augmented data into a plurality of document segments.

Transforming the source document combined with the retrieved augmented data may further include transforming each of the plurality of document segments into one or more respective transformed segments according to one or more transformations. Transforming the source document combined with the retrieved augmented data may include transforming the source document combined with the retrieved data according to one or more of, for example, a coarse linearization transform (e.g., according to the fast-match or fast-search procedure) to generate a plurality of vectors representative of content of the source document combined with the retrieved augmented data, and/or a fine-detail transformation to generate high-resolution transformed content records (from which a narrowed range of the location of an answer in the source content can be determined) representative of the content of the source document combined with the retrieved augmented data.

The method may further include deriving a summary of the source document combined with the augmented data based on the transformed question-and-answer searchable document. Deriving the summary may include identifying at least one portion of the transformed question-and-answer searchable document with a level of similarity to a predetermined summary record, from a repository of summary records, that exceeds a similarity threshold.

As also noted above, the document processing implementations described herein may include different artificial intelligence (AI) techniques to implement variants of vector searching (e.g., implement a practical/productizable transformer-based document Q-A and retrieval). The transformers-based approaches described herein provide high accuracy (better than elastic search), and can be used for automatic Q-A corpus generation (for training), and for "MI" training. Computational effort of such techniques can achieve non-linear scaling (non-linear growth with the size of the document library) that is less than linear scaling. The transformer techniques also offer enhanced customization performance to reduce required training material for large documents, with higher accuracy. Implementations may also include pre-computation of document section vectors, client-specific adaptation of Q-A models, hierarchical fast match, sliding window searching, context augmentation to include more than the literal words (e.g., subject headings) so that limited context of transformer is not too limiting, etc.

In some embodiments, a method is provided that includes receiving one or more source documents associated with a first entity of a plurality of entities, each of the plurality of entities associated with a respective one of question-and-answer models used for processing data, and transforming the one or more source documents associated with the first entity according to the respective associated first question-and-answer model to generate one or more question-and-answer searchable documents.

Embodiments of the method may include one or more of the following features. Transforming the one or more source documents associated with the first entity may include transforming the one or more source documents according to one or more of, for example, a linearization transform to generate a plurality of numerical vectors representative of content of a plurality of document segments for the one or more source documents, and/or a fine-detail transformation to generate fine-detail transformed content records representative of the content of the plurality of document segments. The method may further include applying a linearization transform to one or more of the fine-detail transformed content records to derive resultant fine-resolution numerical vectors for content corresponding to the one or more of the fine-detail transformed content. In some examples, the fine-detail transformation may include a transformation, applied to one or more document segments, based on Bidirectional Encoder Representations from Transformers (BERT) processing. The method may further include receiving query data representative of a question relating to the one or more source documents, and performing a fast search applied to the plurality of numerical vectors generated from application of the linearization transform to segments of the one or more source documents to identify a plurality of match candidates responsive to the query data. The method may further include performing a finer detailed search to identify a match of the query data to portions of content transformed according to the fine-detail transformed objects, with the portions selected according to the plurality of match candidates identified according to the fast search.

In some examples, transforming the one or more source documents associated with the first entity may include transforming the one or more source documents using a neural network trained according to the first question-and-answer model. The method may further include receiving query data representative of a question relating to the one or more source documents, and performing a sliding window search to identify a match of the query data to ordered portions of content transformed according to, for example, a fine-detail transformed objects.

In some embodiments, transforming the one or more source documents associated with the first entity may further include applying one or more pre-processes to the one or more source documents, including segmenting a source document from the one or more source documents into a plurality of document segments. Segmenting the source document may include adding to each segment contextual information representative of the structure and content of the source document. In such embodiments, transforming the one or more source documents may include transforming the segmented source document based, in part, on the contextual information added to each segment.

The method may further include augmenting content of a source document (from the one or more source documents), with the augmenting including one or more of, for example, retrieving the augmented data based on links included in the source document, and/or performing co-reference resolution to determine one or more names or expressions identified in the source document, and searching information repositories accessible from the local device to retrieve additional information associated with the determined one or more names or expressions identified in the source document. Transforming the one or more source documents may include transforming the source document comprising the augmented content. Transforming the one or more source documents may include transforming the one or more source document using, at least in part, pre-computed document segment vectors.

It is to be noted that the various implementations (systems, devices, and methods) described in relation to FIGS. 1-7 may be adjusted, as needed, in accordance with specific document types that are processed and searched in the implementations described herein. For example, variations to implementations (including criteria used, threshold levels used, etc.) configured to process a PDF document may be needed in order to process Word MS or text documents.

Unless defined otherwise, all technical and scientific terms used herein have the same meaning as commonly or conventionally understood. As used herein, the articles "a" and "an" refer to one or to more than one (i.e., to at least one) of the grammatical object of the article. By way of example, "an element" means one element or more than one element. "About" and/or "approximately" as used herein when referring to a measurable value such as an amount, a temporal duration, and the like, encompasses variations of ±20% or ±10%, ±5%, or +0.1% from the specified value, as such variations are appropriate in the context of the systems, devices, circuits, methods, and other implementations described herein. "Substantially" as used herein when referring to a measurable value such as an amount, a temporal duration, a physical attribute (such as frequency), and the like, also encompasses variations of ±20% or ±10%, ±5%, or +0.1% from the specified value, as such variations are appropriate in the context of the systems, devices, circuits, methods, and other implementations described herein.

As used herein, including in the claims, "or" as used in a list of items prefaced by "at least one of" or "one or more of" indicates a disjunctive list such that, for example, a list of "at least one of A, B, or C" means A or B or C or AB or AC or BC or ABC (i.e., A and B and C), or combinations with more than one feature (e.g., AA, AAB, ABBC, etc.). Also, as used herein, unless otherwise stated, a statement that a function or operation is "based on" an item or condition means that the function or operation is based on the stated item or condition and may be based on one or more items and/or conditions in addition to the stated item or condition.

Although particular embodiments have been disclosed herein in detail, this has been done by way of example for purposes of illustration only, and is not intended to be limit the scope of the invention, which is defined by the scope of the appended claims. Any of the features of the disclosed embodiments described herein can be combined with each other, rearranged, etc., within the scope of the invention to produce more embodiments. Some other aspects, advantages, and modifications are considered to be within the scope of the claims provided below. The claims presented are representative of at least some of the embodiments and features disclosed herein. Other unclaimed embodiments and features are also contemplated.

What is claimed is:

1. A method for information retrieval from documents in a document storage using a computer-implemented information-retrieval system coupled to the document storage, the method comprising:

determining configuration data for a first trained neural network transformer and for a second trained neural network transformer using a first training data set that includes pairs of inputs, at least some of the pairs includes a query sequence and a document sequence such that the document sequence includes an answer to the query, wherein the determining includes updating said configuration data according to comparisons for output of the first trained neural network transformer and the second trained neural network transformer for pairs of the training data;

determining configuration data for a third trained neural network transformer using a second training data set that includes pairs of inputs, at least some of the pairs includes a query sequence and a document sequence such that the document sequence includes an answer to the query, wherein the determining includes updating said configuration data so that an output of said transformer provides an output indicative of whether the document sequence includes an answer to the query and so that an output of said transformer provides an output indicative of a span in the document sequence containing an answer to the query;

ingesting a plurality of documents, including receiving the plurality of documents from the document storage, segmenting the documents into a plurality of document segments, at least some documents each being segmented into multiple segments, processing, using the computer-implemented information-retrieval system, each segment of the plurality of segments using the first trained neural network transformer to produce a corresponding fixed length numerical representation of said segment, and storing the fixed length numerical representations in association with corresponding segments;

after the ingesting of the plurality of documents, receiving a query, processing the query using the second trained neural network transformer to produce a fixed length numerical representation of the query, comparing the fixed length numerical representation of the query to multiple of the fixed length numerical representations of segments of the plurality of segments, and determining one or more matching segments according to a closeness of the respective numerical representations, the one or more matching segments include a first matching segment;

after determining the one or more matching segments, forming a combination from the query and at least the first matching segment, and using the third trained neural network transformer to process the combination produce a detailed output;

determining a response to the query from the detailed output; and providing the response.

2. The method of claim 1, wherein the query is received from a user, and the response is provided to said user.

3. The method of claim 1, wherein the detailed output comprises a representation of a span of the response in the first matching segment, and determining of the response comprises extracting said span from the first matching segment.

4. The method of claim 1, wherein the comparing of the fixed length numerical representations comprises computing a distance between said representations, and determining of the configuration data is according to distances between for output of the first trained neural network transformer and the second trained neural network transformer for pairs of the training data.

5. The method of claim 1, wherein the first trained neural network transformer and the second trained neural network transformer comprise Bidirectional Encoder Representations of Transformers (BERT) models.

6. The method of claim 1, wherein forming a combination from the query and at least the first matching segment comprises forming a concatenation of said query and said segment.

7. The method of claim 6, wherein the third neural network transformer comprises a Bidirectional Encoder Representations of Transformers (BERT) model.

8. The method of claim 1, wherein the determining the configuration data for the third trained neural network transformer further comprises updating said configuration data so that an output of said transformer provides an output indicative of a span in the document sequence containing an answer to the query.

9. The method of claim 1, wherein processing the query comprises forming a token sequence from the query, tokens in said sequence comprising words or parts of words in the query, and processing the document segments comprises forming respective token sequences comprising words or parts of words in said segments.

10. The method of claim 2, wherein:

the detailed output comprises a representation of a span of the response in the first matching segment, and determining of the response comprises extracting said span from the first matching segment;

the comparing of the fixed length numerical representations comprises computing a distance between said representations, and determining of the configuration data is according to distances between for output of the first trained neural network transformer and the second trained neural network transformer for pairs of the training data;

forming a combination from the query and at least the first matching segment comprises forming a concatenation of said query and said segment.

11. The method of claim 10, wherein:

the first trained neural network transformer and the second trained neural network transformer comprise Bidirectional Encoder Representations of Transformers (BERT) models; and the third neural network transformer comprises a Bidirectional Encoder Representations of Transformers (BERT) model.

12. A method for information retrieval comprising:

configuring neural networks for use in information retrieval from documents in a document storage using a computer-implemented information-retrieval system coupled to the document storage, the configuring of the neural networks comprising:

determining configuration data for a first trained neural network transformer and for a second trained neural network transformer using a first training data set that includes pairs of inputs, at least some of the pairs includes a query sequence and a document sequence such that the document sequence includes an answer to the query, wherein the determining includes updating said configuration data according to comparisons for output of the first trained neural network transformer and the second trained neural network transformer for pairs of the training data; and determining configuration data for a third trained neural network transformer using a second training data set that includes pairs of inputs, at least some of the pairs includes a query sequence and a document sequence such that the document sequence includes an answer to the query, wherein the determining includes updating said configuration data so that an output of said transformer provides an output indicative of whether the document sequence includes an answer to the query and so that an output of said transformer provides an output indicative of a span in the document sequence containing an answer to the query;

providing the configuration data for the first, second, and third trained neural network transformers for use in processing segments of documents and a query;

providing instructions stored on a non-transitory machine-readable medium for the processing of the segments of the documents and the query, the instruction when executed by a data processing system cause said system to use the configuration data to perform operations including using the first trained neural network transformer to generate fixed length numerical representations of segments of documents, using the second trained neural network transformer to generate a fixed length numerical representation of the query, selecting a subset of the segments of documents based on comparison of the fixed length numerical representation of the query and the fixed length numerical representations of segments, and using the third trained neural network transformer to process a combination of the query and at least one segment in the subset of segments.

13. The method of claim 12, wherein using the third trained neural network transformer comprises producing a detailed output form the third neural network, said detailed output comprising a representation of a span of a response in the at least one segment.

14. The method of claim 12, wherein the first trained neural network transformer and the second trained neural network transformer comprise Bidirectional Encoder Representations of Transformers (BERT) models.

15. The method of claim 14, wherein the third neural network transformer comprises a Bidirectional Encoder Representations of Transformers (BERT) model.

16. A non-transitory machine-readable medium comprising instructions stored thereon, wherein executing said instructions using a data-processing system causes said system to perform steps including:

determining configuration data for a first trained neural network transformer and for a second trained neural network transformer using a first training data set that includes pairs of inputs, at least some of the pairs includes a query sequence and a document sequence such that the document sequence includes an answer to the query, wherein the determining includes updating said configuration data according to comparisons for output of the first trained neural network transformer and the second trained neural network transformer for pairs of the training data;

determining configuration data for a third trained neural network transformer using a second training data set that includes pairs of inputs, at least some of the pairs includes a query sequence and a document sequence such that the document sequence includes an answer to the query, wherein the determining includes updating said configuration data so that an output of said transformer provides an output indicative of whether the document sequence includes an answer to the query and so that an output of said transformer provides an output indicative of a span in the document sequence containing an answer to the query;

ingesting a plurality of documents, including receiving the plurality of documents from a data storage, segmenting the documents into a plurality of document segments, at least some documents each being segmented into multiple segments, processing, using a computer-implemented information-retrieval system, each segment of the plurality of segments using the first trained neural network transformer to produce a corresponding fixed length numerical representation of said segment, and storing the fixed length numerical representations in association with corresponding segments;

after the ingesting of the plurality of documents, receiving a query, processing the query using the second trained neural network transformer to produce a fixed length numerical representation of the query, comparing the fixed length numerical representation of the query to multiple of the fixed length numerical representations of segments of the plurality of segments, and determining one or more matching segments according to a closeness of the respective numerical representations, the one or more matching segments include a first matching segment;

after determining the one or more matching segments, forming a combination from the query and at least the first matching segment, and using the third trained neural network transformer to process the combination produce a detailed output;

determining a response to the query from the detailed output; and providing the response.

* * * * *